US012480355B2

(12) United States Patent
Abe et al.

(10) Patent No.: US 12,480,355 B2
(45) Date of Patent: Nov. 25, 2025

(54) GLASS PANEL UNIT, GETTER MATERIAL, GETTER MATERIAL COMPOSITION, AND METHOD FOR MANUFACTURING GLASS PANEL UNIT

(71) Applicant: Panasonic Intellectual Property Management Co., Ltd., Osaka (JP)

(72) Inventors: Hiroyuki Abe, Osaka (JP); Eiichi Uriu, Osaka (JP); Tasuku Ishibashi, Ishikawa (JP); Kazuya Hasegawa, Osaka (JP); Masataka Nonaka, Osaka (JP); Takeshi Shimizu, Osaka (JP); Naoki Kosugi, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 45 days.

(21) Appl. No.: 17/922,937

(22) PCT Filed: Apr. 26, 2021

(86) PCT No.: PCT/JP2021/016576
§ 371 (c)(1),
(2) Date: Nov. 2, 2022

(87) PCT Pub. No.: WO2021/225083
PCT Pub. Date: Nov. 11, 2021

(65) Prior Publication Data
US 2023/0167671 A1  Jun. 1, 2023

(30) Foreign Application Priority Data

May 8, 2020 (JP) .................................. 2020-082839
Nov. 18, 2020 (JP) .................................. 2020-191933

(51) Int. Cl.
  *E06B 3/66* (2006.01)
  *C03C 27/06* (2006.01)
  *E06B 3/677* (2006.01)

(52) U.S. Cl.
  CPC ............ *E06B 3/6612* (2013.01); *C03C 27/06* (2013.01); *E06B 3/6775* (2013.01); *C03C 2201/06* (2013.01)

(58) Field of Classification Search
  None
  See application file for complete search history.

(56) References Cited

U.S. PATENT DOCUMENTS 4,476,169 A * 10/1984 Nishino ............. B01J 20/28019
                                                   428/407
2005/0173297 A1    8/2005 Toida
(Continued)

FOREIGN PATENT DOCUMENTS

EP     3647291 A1    5/2020
JP     H02-233146 A  9/1990
(Continued)

OTHER PUBLICATIONS

International Search Report dated Jul. 6, 2021 issued in International Patent Application No. PCT/JP2021/016576, with English translation.
(Continued)

*Primary Examiner* — Anthony J Frost
(74) *Attorney, Agent, or Firm* — Rimon P.C.

(57) ABSTRACT

A glass panel unit includes: a first glass pane; a second glass pane facing the first glass pane; a frame member; an evacuated space; and a gas adsorbent. The frame member hermetically bonds the first glass pane and the second glass pane. The evacuated space is surrounded with the first glass pane, the second glass pane, and the frame member. The gas
(Continued)

adsorbent is placed in the evacuated space. The gas adsorbent contains a getter material. The getter material contains a plurality of particles of a zeolite crystal. At least one particle accounting for a half or more of a total weight of the plurality of particles has a particle size equal to or greater than 200 nm. An activable temperature of the at least one particle is equal to or lower than 400° C.

7 Claims, 13 Drawing Sheets

(56) References Cited

U.S. PATENT DOCUMENTS

| | | | | |
|---|---|---|---|---|
| 2008/0272333 | A1* | 11/2008 | Blanco-Garcia | ........ C01B 3/001 257/E23.137 |
| 2014/0166926 | A1* | 6/2014 | Lee | ...................... C04B 38/085 252/181.2 |
| 2016/0136612 | A1* | 5/2016 | Sato | ...................... F16L 59/065 423/700 |
| 2018/0320436 | A1* | 11/2018 | Abe | ........................ C03C 27/06 |
| 2021/0009471 | A1 | 1/2021 | Abe et al. | |
| 2022/0243527 | A1 | 8/2022 | Abe et al. | |

FOREIGN PATENT DOCUMENTS

| | | |
|---|---|---|
| JP | H10-279885 A | 10/1998 |
| JP | 2007-070273 A | 3/2007 |
| JP | 2009-221481 A | 10/2009 |
| JP | 2016-108799 A | 6/2016 |
| TW | 201309383 A1 | 3/2013 |
| WO | 2006/033380 A1 | 3/2006 |
| WO | 2019/003475 A1 | 1/2019 |
| WO | 2019/004135 A1 | 1/2019 |
| WO | 2019/167666 A1 | 9/2019 |
| WO | 2019/188424 A1 | 10/2019 |
| WO | 2020/255974 A1 | 12/2020 |

OTHER PUBLICATIONS

Extended European Search Report dated Dec. 19, 2023 issued in the corresponding European Patent Application No. 21800356.4.
Notice of Reasons for Refusal dated May 13, 2025 issued in the corresponding Japanese Patent Application No. 2024-038933, with English translation.
Notice of Reasons for Refusal dated May 27, 2025 issued in the corresponding Japanese Patent Application No. 2024-038932, with English translation.

* cited by examiner

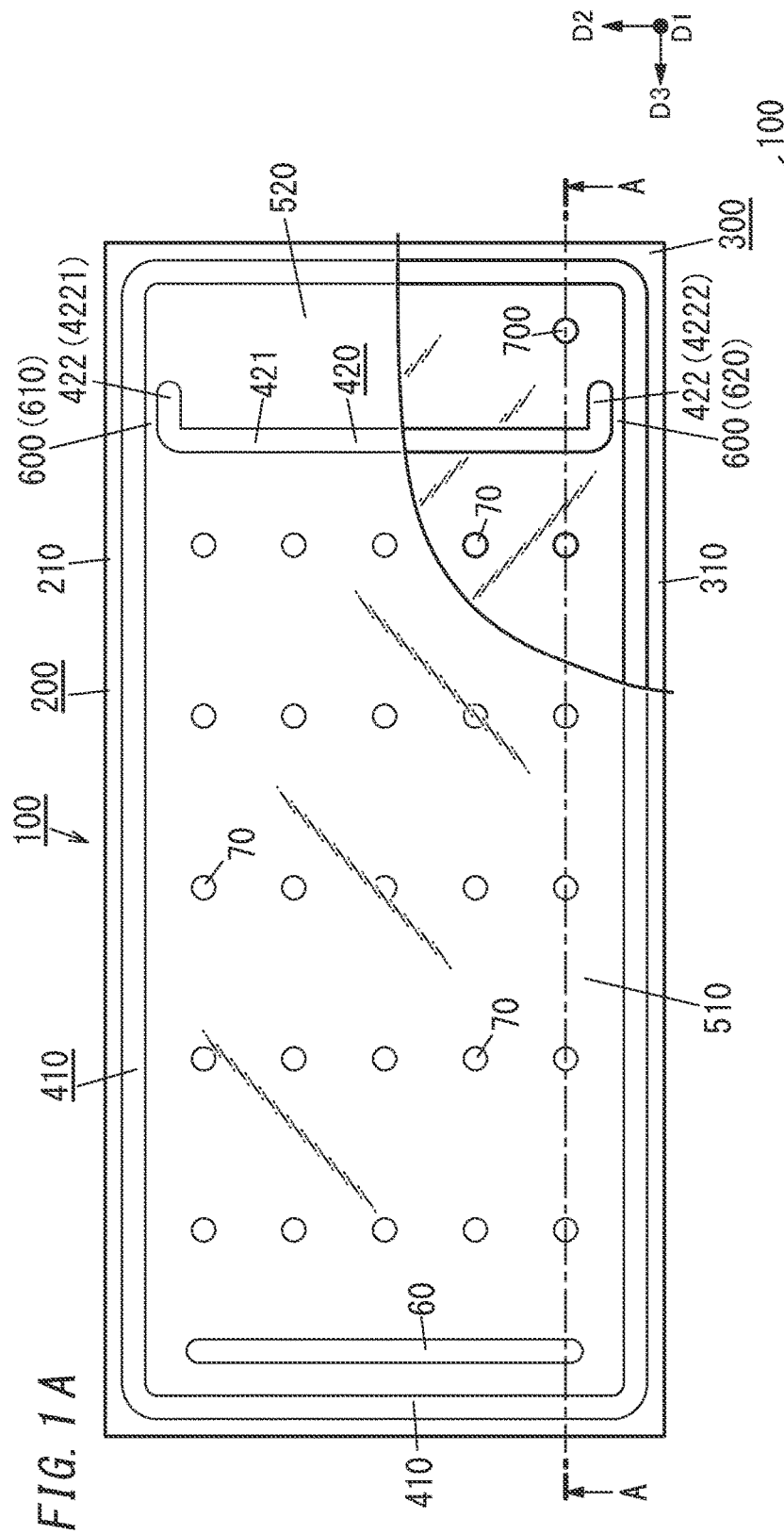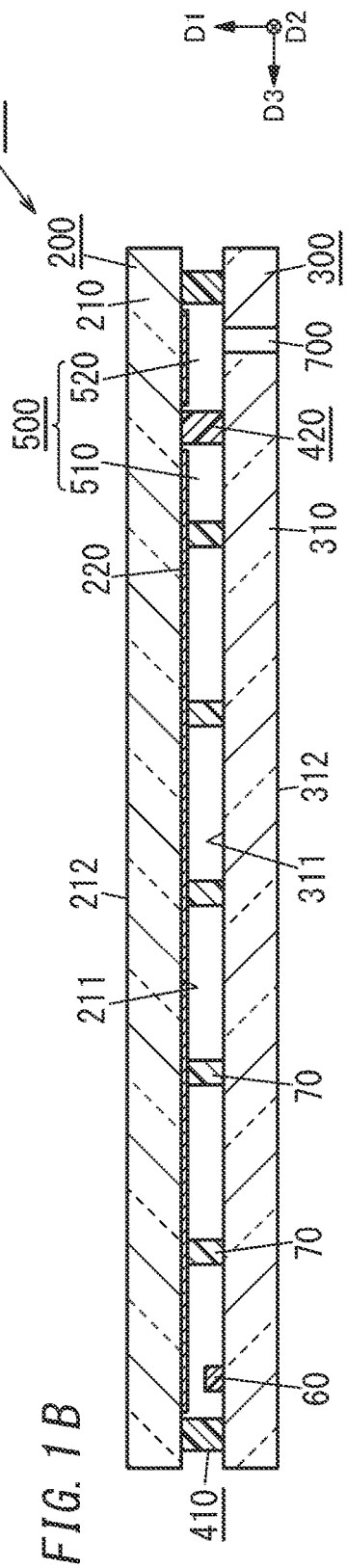
FIG. 1A
FIG. 1B

GLASS PANEL UNIT, GETTER MATERIAL, GETTER MATERIAL COMPOSITION, AND METHOD FOR MANUFACTURING GLASS PANEL UNIT

CROSS-REFERENCE OF RELATED APPLICATIONS

This application is the U.S. National Phase under 35 U.S.C. § 371 of International Patent Application No. PCT/JP2021/016576, filed on Apr. 26, 2021, which in turn claims the benefit of Japanese Patent Application No. 2020-082839, filed on May 8, 2020, and Japanese Patent Application No. 2020-191933, filed on Nov. 18, 2020, the entire disclosures of which Applications are incorporated by reference herein.

TECHNICAL FIELD

The present disclosure generally relates to a glass panel unit, a getter material, a getter material composition, and a method for manufacturing the glass panel unit. More particularly, the present disclosure relates to a thermally insulating glass panel unit, a getter material, a getter material composition, and a method for manufacturing such a glass panel unit.

BACKGROUND ART

Patent Literature 1 discloses a glass panel unit including a gas adsorbent inside. Patent Literature 1 also teaches using a zeolite-based material as the gas adsorbent.

CITATION LIST

Patent Literature

Patent Literature 1: WO 2019/004135 A1

SUMMARY OF INVENTION

Patent Literature 1, however, discloses nothing about the size of the zeolite used as a constituent material for the gas adsorbent, and therefore, still has room for improvement.

The problem to be overcome by the present disclosure is to provide a glass panel unit having a getter material that achieves a sufficient adsorption performance in a low-pressure range even if the manufacturing process of the glass panel unit is performed at lower temperatures, and also provide such a getter material, a getter material composition, and a method for manufacturing such a glass panel unit.

A glass panel unit according to an aspect of the present disclosure includes: a first glass pane; a second glass pane facing the first glass pane; a frame member; an evacuated space; and a gas adsorbent. The frame member hermetically bonds the first glass pane and the second glass pane. The evacuated space is surrounded with the first glass pane, the second glass pane, and the frame member. The gas adsorbent is placed in the evacuated space. The gas adsorbent contains a getter material. The getter material contains a plurality of particles of a zeolite crystal. At least one particle accounting for a half or more of a total weight of the plurality of particles has a particle size equal to or greater than 200 nm. An activable temperature of the at least one particle is equal to or lower than 400° C.

A glass panel unit according to another aspect of the present disclosure includes: a first glass pane; a second glass pane facing the first glass pane; a frame member; an evacuated space; and a gas adsorbent. The frame member hermetically bonds the first glass pane and the second glass pane. The evacuated space is surrounded with the first glass pane, the second glass pane, and the frame member. The gas adsorbent is placed in the evacuated space. The gas adsorbent contains a getter material. The getter material contains a plurality of particles of a zeolite crystal. At least one particle accounting for a half or more of a total number of the plurality of particles has a particle size equal to or greater than 200 nm. An activable temperature of the at least one particle is equal to or lower than 400° C.

A glass panel unit according to still another aspect of the present disclosure includes: a first glass pane; a second glass pane facing the first glass pane; a frame member; an evacuated space; and a gas adsorbent. The frame member hermetically bonds the first glass pane and the second glass pane. The evacuated space is surrounded with the first glass pane, the second glass pane, and the frame member. The gas adsorbent is placed in the evacuated space. The gas adsorbent contains a getter material. The getter material contains a plurality of particles of a zeolite crystal. At least one particle accounting for a half or more of a total volume of the plurality of particles has a particle size equal to or greater than 200 nm. An activable temperature of the at least one particle is equal to or lower than 400° C.

A glass panel unit according to yet another aspect of the present disclosure includes: a first glass pane; a second glass pane facing the first glass pane; a frame member; an evacuated space; and a gas adsorbent. The frame member hermetically bonds the first glass pane and the second glass pane. The evacuated space is surrounded with the first glass pane, the second glass pane, and the frame member. The gas adsorbent is placed in the evacuated space. The gas adsorbent contains a getter material. The getter material contains a plurality of particles of a zeolite crystal and a hydrogenation catalyst.

A getter material according to yet another aspect of the present disclosure contains a plurality of particles of a zeolite crystal. At least one particle accounting for a half or more of a total weight of the plurality of particles has a particle size equal to or greater than 200 nm. An activable temperature of the at least one particle is equal to or lower than 400° C.

A getter material composition according to yet another aspect of the present disclosure contains a getter material and a solvent. The getter material contains a plurality of particles of a zeolite crystal. An activatable temperature of the plurality of particles is equal to or lower than 400° C.

A getter material composition according to yet another aspect of the present disclosure contains a getter material and a solvent. The getter material contains a plurality of particles of a zeolite crystal. The plurality of particles includes at least one particle having a particle size equal to or greater than 200 nm.

A method for manufacturing a glass panel unit according to yet another aspect of the present disclosure includes a working step, an assembling step, a bonding step, and a gas exhausting step. The working step includes preparing the getter material composition described above. The assembling step includes preparing an assembly including a first glass pane, a second glass pane, a peripheral wall having a frame shape, an internal space, a gas adsorbent made of the getter material composition described above, and an exhaust port. The bonding step includes hermetically bonding the first glass pane and the second glass pane by melting the peripheral wall. The gas exhausting step includes exhausting a gas from the internal space through the exhaust port to turn the internal space into an evacuated space.

A glass panel unit according to yet another aspect of the present disclosure includes: a first glass pane; a second glass pane facing the first glass pane; a frame member; an evacuated space; and a gas adsorbent. The frame member hermetically bonds the first glass pane and the second glass pane. The evacuated space is surrounded with the first glass pane, the second glass pane, and the frame member. The gas adsorbent is placed in the evacuated space. The gas adsorbent contains a getter material. The getter material contains a plurality of particles of a zeolite crystal. At least one particle accounting for a half or more of a total weight of the plurality of particles has a particle size equal to or greater than 200 nm. At least one of a softening point, a melting point, or a bondable temperature of a sealant is equal to or lower than 350° C.

BRIEF DESCRIPTION OF DRAWINGS

FIG. 1A is a plan view illustrating an assembly as an intermediate product of a glass panel unit according to a first embodiment;

FIG. 1B is a cross-sectional view thereof taken along the plane A-A in FIG. 1A;

DESCRIPTION OF EMBODIMENTS

Figure 2:
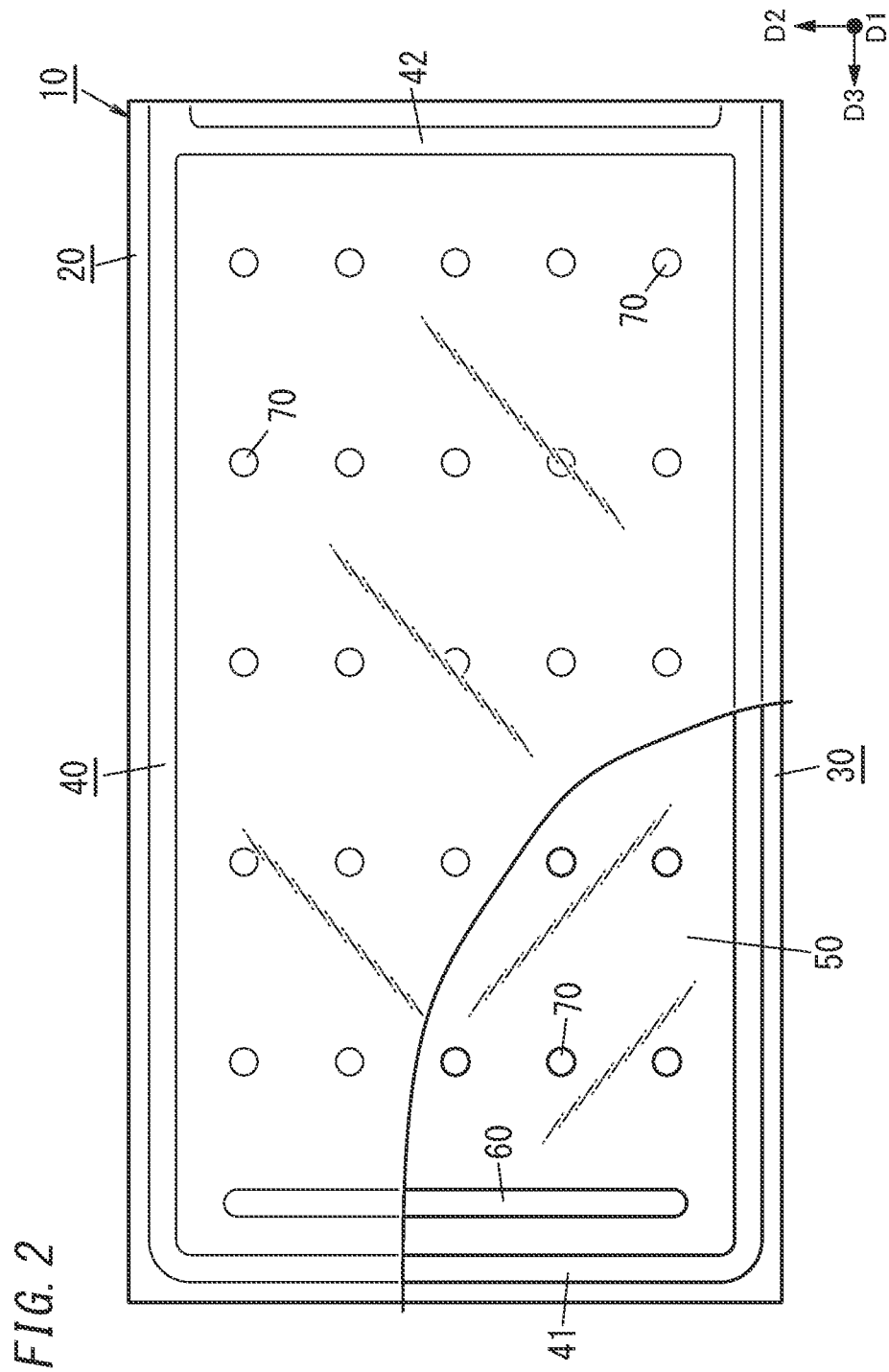
FIG. 2 is a plan view illustrating the glass panel unit.

First of all, it will be described how the present inventors conceived the concept of the present disclosure.

A glass panel unit is provided with thermal insulation properties by creating an evacuated space (or a vacuum space) between two glass panes. Nevertheless, such thermal insulation properties of the glass panel unit would decline, despite the presence of the evacuated space between the two glass panes, if any residual gas remains in the evacuated space. Thus, to reduce the quantity of such a residual gas remaining in the evacuated space, a gas adsorbent is provided in the evacuated space. A gas adsorbent including a getter material of zeolite has been used in the art (see Patent Literature 1).

When put in either the air or a solution, a zeolite has adsorbed a lot of gas therein. Thus, to use a zeolite as a gas adsorbent achieving a sufficient adsorption performance in an evacuated space, adsorption sites thereof need to be expressed by heating the zeolite in a vacuum and thereby desorbing the gases adsorbed into the zeolite (i.e., activating the zeolite). In a copper ion-exchanged zeolite, in particular, powerful nitrogen adsorption sites are expressed by reducing (i.e., desorbing oxygen from) copper oxide. At this time, unless the zeolite is activated at a sufficiently high temperature, neither oxygen nor another gas such as moisture cannot be desorbed, and a sufficient adsorption performance cannot be achieved.

During the manufacturing process of a glass panel unit, the zeolite may be activated, for example, in a gas exhausting step, which is started either halfway through, or at the end of, a first melting step (bonding step). At this time, if the zeolite can be sufficiently heated during the gas exhausting step, a sufficient adsorption performance may be achieved. Meanwhile, in order to shorten the production takt time, simplify the manufacturing equipment, and cope with reinforced glass, there has been growing demands for performing the glass panel unit manufacturing process at lower temperatures. That is why the zeolite preferably exhibits a sufficiently powerful adsorption capability even in a low-temperature gas exhausting step (i.e., is preferably activated at lower temperatures).

Even nitrogen, which is generally difficult to adsorb in a low-pressure range, is also released when exposed to an ultraviolet ray either during the manufacturing process of the glass panel unit or while the glass panel unit is being used after the manufacturing process thereof. Thus, a copper ion-exchanged zeolite having the ability to adsorb nitrogen as well is particularly preferred. Nevertheless, unless the copper ion-exchanged zeolite is activated sufficiently in a low-temperature process (e.g., in a gas exhausting step performed at a low temperature or in an activation step performed at a low temperature), it is difficult to express powerful adsorption sites with respect to nitrogen and a sufficient adsorption performance cannot be achieved.

In a particle of a zeolite crystal, its surface has a great many micropores, through which a target gas is absorbed and retained (adsorbed) in the complicated internal spaces. In general, it is believed that the gas adsorption capability of such a zeolite particle is proportional to the magnitude of the surface area. As for the combined surface area of the zeolite particles, if the total weight of a lot of zeolite particles is constant (in other words, the smaller the particle size of the zeolite particles is and the larger the number of the zeolite particles is per unit weight), the combined surface area of the zeolite particles increases. That is why as the particle size of the zeolite particles decreases, the gas adsorption capability per unit weight increases. Note that the size of a zeolite particle is herein supposed to be synonymous with the size (crystal size) of a zeolite crystal. In addition, the zeolite particle as described herein is supposed to be a primary particle. That is to say, the zeolite particle is not an aggregate (secondary particle) but is a zeolite crystal.

However, the present inventors discovered, via extensive research, that even if the total volume of the zeolite particles is constant in a low-pressure range (particularly, in a range close to a vacuum) in which the pressure is reduced to a predetermined degree from the atmospheric pressure, a higher gas adsorption capability is achievable when the zeolite particles have a relatively large particle size than when the zeolite particles have a relatively small particle size. The present inventors also discovered that this trend grew significantly, particularly when the zeolite was activated at low temperatures. The present inventors conceived the concept of the present disclosure by discovering that a powerful gas adsorption capability would be achieved in a low-pressure range by taking advantage of such a property of zeolite particles. That is to say, this embodiment enables providing a getter material and a getter material composition that would achieve thermal insulation in either a vacuum space or an evacuated space in order to obtain a gas adsorbent having a powerful gas adsorption capability in a low-pressure range.

First Embodiment

Next, an overview of a glass panel unit 10 according to a first embodiment and a method for manufacturing the glass panel unit 10 will be described.

As shown in FIG. 2, the glass panel unit 10 includes a first glass pane 20, a second glass pane 30 facing the first glass pane 20, a frame member 40, an evacuated space 50, and a gas adsorbent 60. The frame member 40 hermetically bonds the first glass pane 20 and the second glass pane 30. The evacuated space 50 is surrounded with the first glass pane 20, the second glass pane 30, and the frame member 40. The gas adsorbent 60 is placed in the evacuated space 50. The gas adsorbent 60 contains a getter material.

Figure 5:
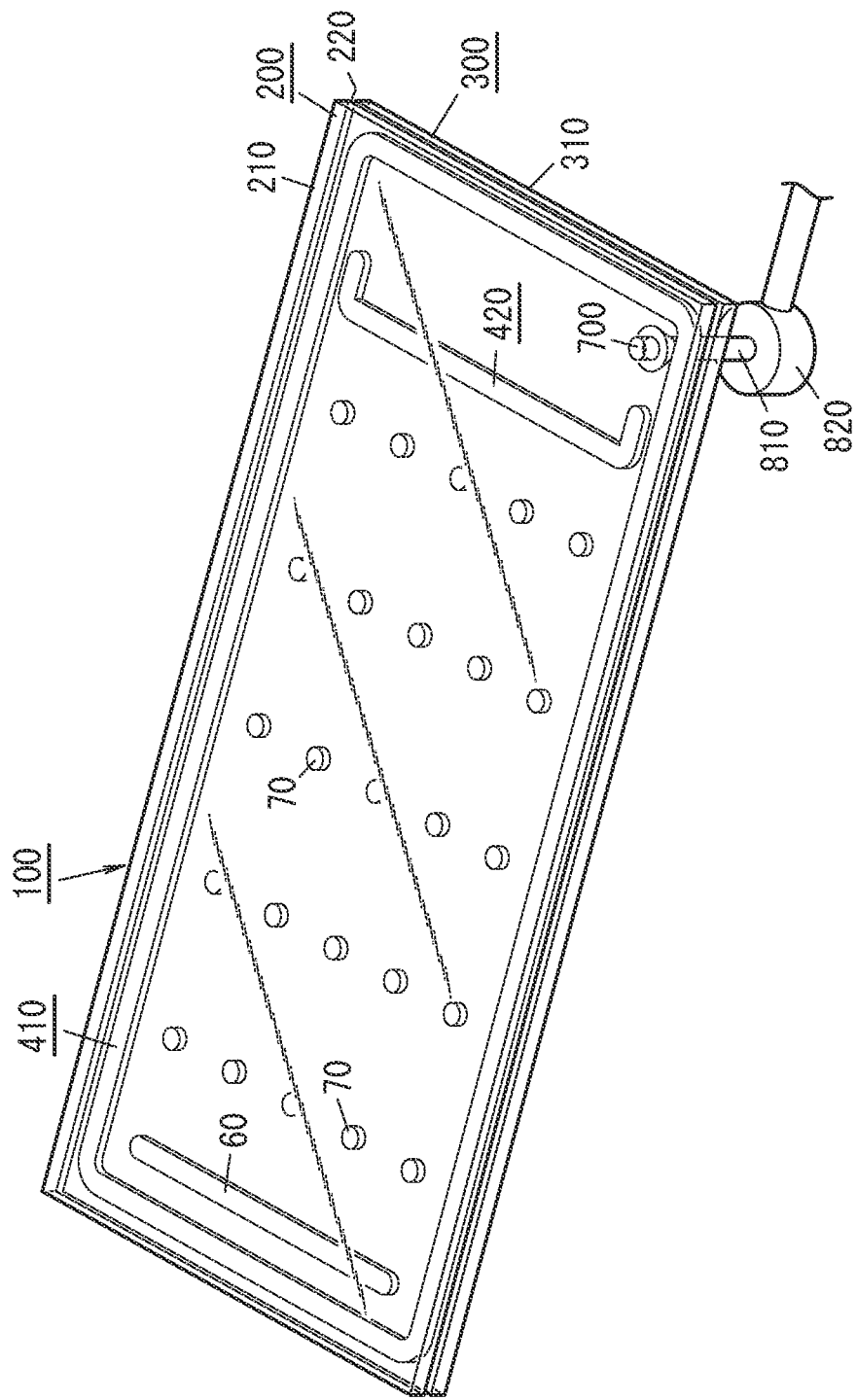
FIG. 5 illustrates still another step of the method for manufacturing the glass panel unit according to the first embodiment.
Figure 6:
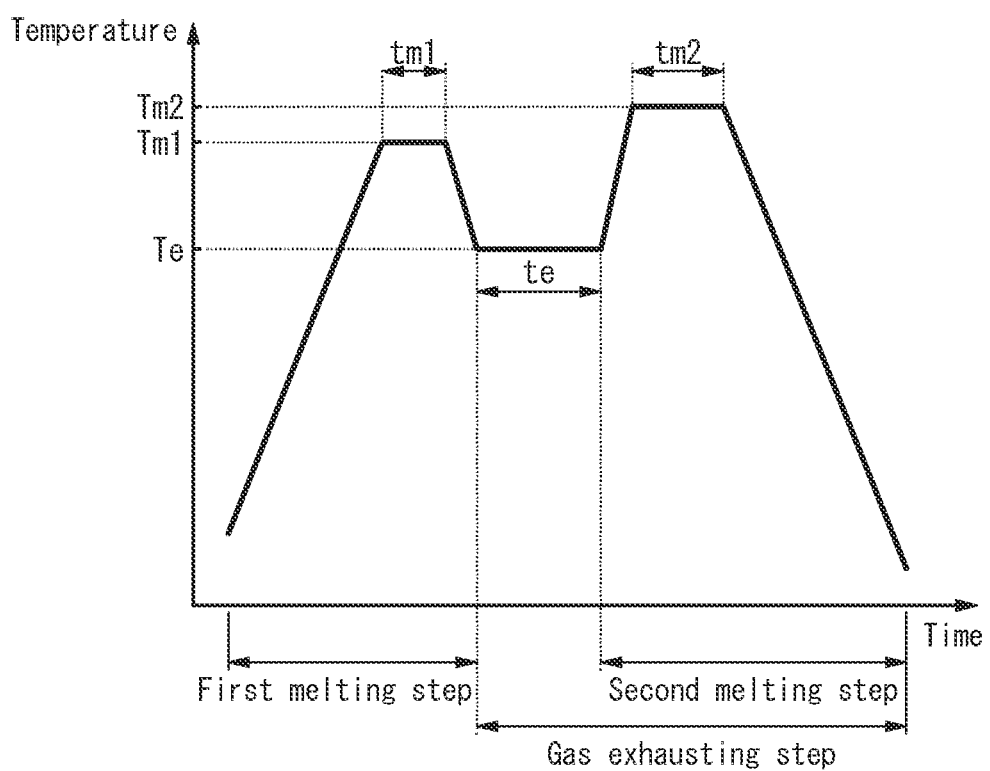
FIG. 6 shows how to perform respective steps of the method for manufacturing the glass panel unit according to the first embodiment.

A method for manufacturing such a glass panel unit 10 includes a working step, an assembling step (see FIGS. 3-5), a bonding step (a first melting step, see FIG. 6), and a gas exhausting step (see FIG. 6). The working step includes a getter material making step. The getter material making step includes obtaining a getter material containing a plurality of particles of a zeolite crystal. The assembling step includes preparing an assembly 100. The assembly 100 includes a first glass pane 200, a second glass pane 300, a peripheral wall 410 having a frame shape, an internal space 500, a gas adsorbent 60, and an exhaust port 700 (see FIGS. 1A and 1B). The second glass pane 300 faces the first glass pane 200. The peripheral wall 410 is provided between the first glass pane 200 and the second glass pane 300. The internal space 500 is surrounded with the first glass pane 200, the second glass pane 300, and the peripheral wall 410. The gas adsorbent 60 is placed in the internal space 500 and contains the getter material. The exhaust port 700 allows the internal space 500 to communicate with an external environment. The bonding step includes melting the peripheral wall 410 to hermetically bond the first glass pane 200 and the second glass pane 300. The gas exhausting step includes exhausting a gas from the internal space 500 through the exhaust port 700 to turn the internal space 500 into an evacuated space 50. A method for manufacturing the glass panel unit 10 (hereinafter simply referred to as a "manufacturing method") will be described in detail with reference to FIGS. 1-8. This manufacturing method is a method for manufacturing a glass panel unit 10 such as the one shown in FIG. 2. In the following description of this embodiment, the direction D1 is a direction parallel to the thickness of a first glass pane 200, the direction D2 is a direction perpendicular to the direction D1, and the direction D3 is a direction perpendicular to both the direction D1 and the direction D2. Alternatively, these directions D1, D2, D3 may also be simply regarded as first, second, and third directions, respectively.

This manufacturing method includes preparatory steps and a removing step.

Figure 7:
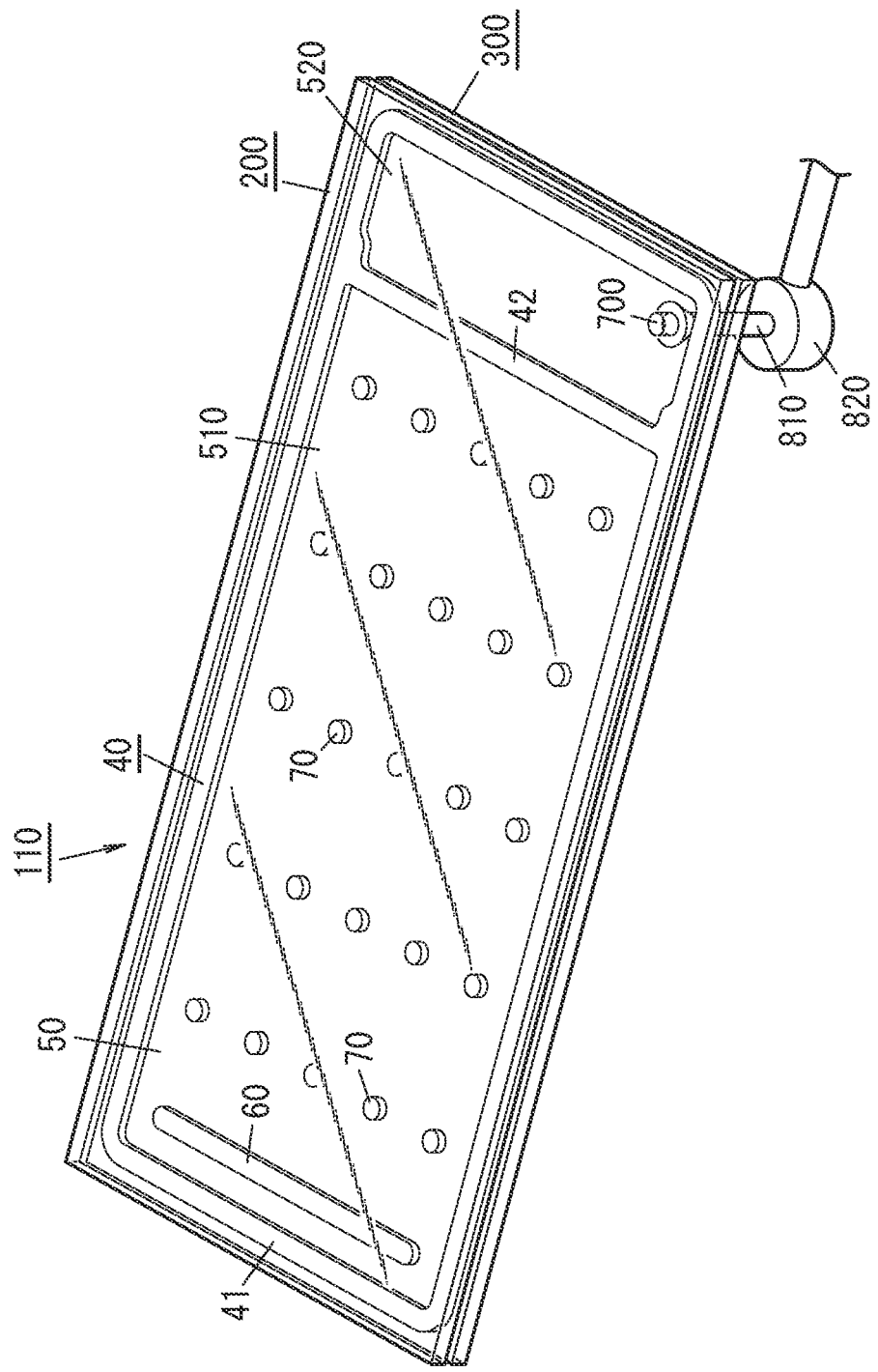
FIG. 7 illustrates yet another step of the method for manufacturing the glass panel unit according to the first embodiment.

The preparatory steps are the steps of providing a work in progress 110 shown in FIG. 7. The work in progress 110 is formed out of the assembly 100 shown in FIGS. 1A and 1B. That is to say, the work in progress 110 is an intermediate product obtained while the glass panel unit 10 (see FIG. 2) is being manufactured. The assembly 100 is an intermediate product obtained while the work in progress 110 is being formed.

The preparatory steps include a working step, an assembling step (see FIGS. 3-5), a bonding step (a first melting step; see FIG. 6), a gas exhausting step (see FIG. 6), and a sealing step (a second melting step; see FIGS. 6 and 7).

The working step is the step of preparing a getter material composition. The getter material composition contains at least a zeolite and a solvent (e.g., at least one of water or an organic solvent). The gas adsorbent 60 is a dried product of the getter material composition. The working step includes a heating step, a getter material making step, and a mixing step. Note that the getter material composition is preferably a substance having flowability such as liquid, paste, ink, or slurry, and is preferably able to be supplied by application or printing, for example.

The heating step is the step of heating the zeolite contained in the gas adsorbent 60. The temperature of the heating step is preferably higher than the temperature of the gas exhausting step (i.e., the exhaust temperature Te to be described later), more preferably higher than the temperature of the first melting step (i.e., the first melting temperature Tm1 to be described later), and particularly preferably higher than the temperature of the second melting step (i.e., the second melting temperature Tm2 to be described later). This enables, before the assembly 100 is fabricated, desorbing a gas component that the zeolite has adsorbed. In particular, heating the zeolite in the heating step enables desorbing, through the heating step, oxygen that has been adsorbed in the zeolite. This may reduce the quantity of oxygen to desorb from the bonding step and on, and therefore, the gas exhausting step may be performed at lower temperatures. As a result, the first melting step and the second melting step may also be performed at lower temperatures. This may cut down the manufacturing cost of the glass panel unit 10 eventually. Note that this heating step is an optional step and may be omitted.

The zeolite is a very small particle (fine particle) made of a porous crystal, of which the surface has a great many micropores. A gas to adsorb is introduced through the micropores of the zeolite and retained (adsorbed) in the complicated internal spaces. Examples of such a gas to be adsorbed into the zeolite include water vapor, carbon dioxide, oxygen, nitrogen, and hydrocarbons such as methane. Among other things, the zeolite may adsorb, in the evacuated space, gases such as nitrogen and hydrocarbon (in particular, nitrogen) which are difficult for any other general adsorbent to adsorb. The zeolite structure has a composition expressed by the following general formula (1):

$$\mathrm{Me}_{2/x}\mathrm{O}\cdot\mathrm{Al}_2\mathrm{O}_3\cdot m\mathrm{SiO}_2\cdot n\mathrm{H}_2\mathrm{O} \qquad (1)$$

where Me is a cation having a valence of x and present in a micropore, m is a silica/alumina ratio and is an integer equal to or greater than 2, and n is an integer equal to or greater than 0. In the composition expressed by this formula (1), a monovalent negative charge is produced at each Al atom. Thus, if Me is a cation having a valence of two or more, then a positive charge is produced in a micropore of the zeolite. On the other hand, if Me is a monovalent cation, then the inside of the micropore becomes electrically neutral.

In the zeolite structure, Me may be a monovalent cation, or a cation having a valence of two or more, or a combination of a monovalent cation and a cation having a valence of two or more. Examples of the monovalent cation include: alkali metal ions such as $Li^+$, $Na^+$, and $K^+$; protons; and an ammonium ion ($NH_4^+$) and $Ag^+$. Examples of the cations having a valence of two or more include: alkali earth metal ions such as $Ca^{2+}$, $Mg^{2+}$, and $Ba^{2+}$; and transition metal ions such as $Cu^{2+}$, $Au^{2+}$, $Fe^{2+}$, $Zn^{2+}$, and $Ni^{2+}$.

Examples of the zeolite structures include a type A zeolite structure, a type X zeolite structure, a type Y zeolite structure, a type L zeolite structure, a type β zeolite structure, a mordenite structure, a ferrierite structure, a USY zeolite structure, a type CHA zeolite structure, a type SAPO zeolite structure, and a ZSM-5 structure (MFI). The zeolite may have any arbitrary zeolite structure other than these structures.

In the general formula (1), water ($H_2O$) is included as crystallization water in the zeolite. Such water may be included, for example, in the micropores of the zeolite particle. Heating the zeolite allows not only this crystallization water but also gas components such as oxygen that have been adsorbed before heating to be desorbed from the zeolite. This may improve the gas adsorptivity of the zeolite. Note that if the crystallization water desorbs completely, then n in the general formula (1) becomes equal to zero.

The zeolite obtained through the heating step is suitably a zeolite from which oxygen has desorbed and to which at least one component (hereinafter sometimes referred to as an "adsorbed component") selected from the group consisting of nitrogen, carbon monoxide, and water has been adsorbed. That is to say, the adsorption capacity of the zeolite obtained through the heating step is preferably saturated with the adsorbed component. In that case, causing the adsorbed component to desorb from the zeolite during heating in the gas exhausting step, for example, allows the zeolite to recover its gas adsorptivity. Note that if the zeolite that has gone through the heating step is mixed with water, nitrogen or methane adsorbed, if any, to the zeolite would be partially replaced with the water.

The zeolite preferably contains a copper ion-exchanged zeolite. The copper ion-exchanged zeolite is a component expressed by the general formula (1) in which Me is a copper ion. In this case, the copper ion-exchanged zeolite is a component in which a copper ion is carried by the zeolite structure. Thus, the "copper ion-exchanged zeolite" does not specify the component before the copper ion is carried by the zeolite structure. Also, the crystal structure of the zeolite is more preferably a ZMS-5 type. A copper ion-exchanged ZSM-5 type zeolite (Cu-ZSM-5) may adsorb nitrogen, methane, and other gases thoroughly under a low pressure even at room temperature. Note that the silica/alumina ratio of the ZSM-5 type is preferably represented by a molar ratio equal to or less than 100 and more preferably represented by a molar ratio equal to or greater than 20 and equal to or less than 45. However, this is only an example and should not be construed as limiting. Also, the copper content preferably falls within the range from 1 wt % to 10 wt %. However, this is only an example and should not be construed as limiting. The zeolite crystal contained in the gas adsorbent 60 according to the present disclosure has a predetermined condition as will be described in detail later.

The getter material making step is the step of obtaining a getter material based on the zeolite that either has been subjected to a heating step or has not been heated yet. The getter material making step may include, for example, obtaining a composite getter material by mixing a particle (crystal) of a zeolite and a particle of a compound other than the zeolite. In addition, the getter material making step further includes the step of preparing a plurality of particles having a predetermined particle size distribution (including a particle of a zeolite and a particle of a different type of zeolite or a particle of a compound other than the zeolite). The getter material may include multiple types of zeolites having mutually different compositions, crystal structures, or particle size distributions, for example, and may also include a non-zeolite particle. After the getter material making step has been performed, a mixing step is performed.

The mixing step is the step of obtaining a getter material composition by mixing a getter material and a solvent. The getter material includes a plurality of particles of the zeolite crystal as described above. Optionally, the getter material may include a particle of a compound other than the zeolite. As the solvent, water, an organic solvent, or a mixture of water and an organic solvent may be used.

If water is used as the solvent, then the water is present in this getter material composition to cover the getter material. This reduces the chances of the getter material in the state of the getter material composition being exposed to the air. In other words, this makes the getter material less likely to adsorb the air (among other things, oxygen in the air). This makes the getter material composition easier to store and reduces the trouble in manufacturing the glass panel unit 10. The content of water in the getter material composition may be selected arbitrarily. Water may be used as the solvent. Alternatively, a solution including water as a main component may also be used as the solvent. For example, the solvent may be water containing, as impurities, an organic substance, calcium, sodium, and other components.

Still alternatively, the solvent may also be a mixture of water and an organic solvent. In that case, the solvent may be a mixed solvent in which water and at most 50% by mass of an organic solvent such as ethanol are mixed. Alternatively, the organic solvent may also be an organic solvent such as ethanol, butyl carbitol acetate, or terpineol, or a mixture thereof. If water is used as the solvent, pure water, ultrapure water, ion exchanged water, or distilled water, for example, is preferably used as much as possible.

On the other hand, if an organic solvent is used as the solvent, then the molecular size of the organic solvent is preferably approximately as large as, or larger than, the micropore size of the zeolite (in particular, the ZSM-5 type zeolite). For example, if the micropore size of the zeolite is 5.5 Å, then the molecular size (i.e., the maximum width of the molecule) of the organic solvent is preferably equal to or greater than 5.5 Å.

If the molecular size of the organic solvent is approximately as large as the micropore size of the zeolite, then the number of solvent molecules entering the micropores of the zeolite decreases. That is to say, the rate of diffusion of the organic solvent molecules into the zeolite decreases and the number of the organic solvent molecules diffusing to enter the inside of the zeolite crystal decreases as well. Consequently, the organic solvent molecules remain in the vicinity of the surface of the zeolite particle, and therefore, not so much energy is needed to desorb those organic solvent molecules.

Also, if the molecular size of the organic solvent is larger than the micropore size of the zeolite, most of the organic solvent molecules cannot enter the micropores of the zeolite. Thus, the organic solvent molecules remain on the surface of the zeolite particle, and therefore, even less energy is needed to desorb those organic solvent molecules.

Therefore, if the molecular size of the organic solvent is approximately as large as, or larger than, the micropore size of the zeolite, then little organic solvent has diffused to enter the inside the zeolite, and therefore, not so much energy is needed to remove the solvent when the gas adsorbent 60 is formed by removing the solvent from the getter material composition. In addition, this also reduces the chances of the organic solvent remaining inside the zeolite, thus making it easier to achieve the advantage by increasing the particle size of the zeolite.

On the other hand, if the molecular size of the organic solvent were smaller than the micropore size of the zeolite, then the organic solvent molecules would diffuse to enter the inside of the zeolite crystal. In that case, a lot of energy would be needed to desorb the organic solvent molecules.

Examples of organic solvents, of which the molecular size is larger than the micropore size (of 5.5 Å) of the zeolite (ZSM-5) and which are aromatic compounds include trimethylbenzene, tetramethylbenzene, pentamethylbenzene, hexamethylbenzene, and m-xylene.

Examples of organic solvents, of which the molecular size is larger than the micropore size (of 5.5 Å) of the zeolite (ZSM-5) and which are non-aromatic compounds include cyclic compounds each having a cyclic structure such as cyclooctane, cycloheptane, dimethylquinoline, α-pinene, β-pinene, pinane, α-pinene oxide, pinocarveol, caryophyllene, verbenone, and isobornyl cyclohexanol.

Examples of organic solvents, of which the molecular size is approximately as large as the micropore size (of 5.5 Å) of the zeolite (ZSM-5) include cyclic compounds, each having a cyclic structure, such as p-xylene, p-menthane, d-limonene, l-limonene, α-terpineol, β-terpineol, γ-terpineol, terpinene, menthol, myrtenal, myrtenol, p-menthane, benzyl benzoate, dihydroterpineol, and dihydroterpinyl acetate.

As can be seen, according to the present disclosure, a cyclic compound having a cyclic structure including either an aromatic compound or a non-aromatic compound is preferably used as the organic solvent. Meanwhile, a molecule of an organic solvent having a straight chain structure will enter the micropores of the zeolite easily, even though its molecular size is large, and therefore, is not preferred. Also, among various cyclic compounds, aromatic compounds are often harmful to the human body and use of aromatic compounds is preferably avoided as much as possible. Instead, a non-aromatic compound is preferably used as the organic solvent.

Also, it is generally believed that a molecule having strong polarity (e.g., a molecule of an organic solvent having an OH group) would be attracted more easily toward the polarity of the zeolite and would not be desorbed easily. However, the present inventors discovered that when a copper ion-exchanged zeolite (Cu-ZSM-5) and various organic solvents were mixed to see, using a GCMS, if solvent components desorbed when heated, molecules of organic solvents having weak polarity and consisting of only carbon and hydrogen such as p-xylene, p-menthane, and d-limonene, tended to be desorbed less easily and remain inside the Cu-ZSM-5 even when heated, among various organic solvents having a molecular size approximately as large as the micropore size (of 5.5 Å) of the zeolite (ZSM-5). This is probably because when the zeolite and a solvent are mixed, molecules having no polarity will take a long time to diffuse and enter the inside of the zeolite while the molecules are stored as part of a mixed solution. On the other hand, solvent molecules including either an OH group or an element such as O, F, or N and having relatively strong polarity will be adsorbed to around the openings of the micropores of the zeolite to close the micropores and will prevent by themselves other molecules from entering the micropores, thus eventually reducing the chances of solvent molecules diffusing to enter the inside of the zeolite particle. The larger the crystal size of the zeolite is, the more significantly this advantage will be achieved. That is why it is advantageous to set the crystal size of the zeolite at 200 nm or more, for example. The crystal size of the zeolite is more preferably equal to or greater than 400 nm, even more preferably equal to or greater than 500 nm, and particularly preferably equal to or greater than 600 nm. It is even better if the crystal size of the zeolite is equal to or greater than 750 nm, equal to or greater than 1000 nm, equal to or greater than 1500 nm, or equal to or greater than 2000 nm.

On the other hand, as for molecules of an organic solvent such as α-pinene and β-pinene, having a molecular size larger than the micropore size (of 5.5 Å) of the zeolite (ZSM-5), consisting of only carbon and hydrogen, and having weak polarity, it was not difficult for the solvents to desorb from Cu-ZSM-5. That is why it is preferable to use either an organic solvent, of which the molecular size is larger than the micropore size (of 5.5 A) of the zeolite (ZSM-5), or an organic solvent, of which the molecular size is approximately as large as the micropore size (of 5.5 Å) of the zeolite (ZSM-5) and of which the molecular structure has an OH group or an element such as O, N, or F. That is to say, the organic solvent to be mixed with the Cu-ZSM-5 type zeolite, of which the crystal size is equal to or greater than 200 nm, preferably includes at least one selected from the group consisting of cyclooctane, cycloheptane, dimethylquinoline, α-pinene, β-pinene, pinane, α-pinene oxide, pinocarveol, caryophyllene, verbenone, isobornyl cyclohexanol, α-terpineol, β-terpineol, γ-terpineol, menthol, myrtenal, myrtenol, benzyl benzoate, dihydroterpineol, and dihydroterpineol acetate. Also, this advantage will be achieved particularly significantly if the process temperature of the glass panel unit (multi-pane glazing unit) is equal to or lower than 350° C., at which the solvent is less likely to desorb from the zeolite. That is to say, this is more advantageous if at least one of the softening point, melting point, or bondable temperature (which is the lowest temperature required to seal the glass panel unit with the sealant) of the sealant (which is at least one of the first sealant or the second sealant) is equal to or lower than 350° C. This is even more advantageous if at least one of the softening point, melting point, or bondable temperature of the sealant (which is at least one of the first sealant or the second sealant) is equal to or lower than 300° C.

Also, the organic solvent to be mixed with the Cu-ZSM-5 type zeolite having a crystal size equal to or greater than 400 nm more preferably includes at least one selected from the group consisting of cyclooctane, cycloheptane, dimethylquinoline, α-pinene, β-pinene, pinane, α-pinene oxide, pinocarveol, caryophyllene, verbenone, isobornyl cyclohexanol, α-terpineol, β-terpineol, γ-terpineol, menthol, myrtenal, myrtenol, benzyl benzoate, dihydroterpineol, and dihydroterpineol acetate. Also, this advantage will be achieved particularly significantly if the process temperature of the glass panel unit (multi-pane glazing unit) is equal to or lower than 350° C., at which the solvent is less likely to desorb from the zeolite. That is to say, this is more advantageous if at least one of the softening point, melting point, or bondable temperature of the sealant (which is at least one of the first sealant or the second sealant) is equal to or lower than 350° C. This is even more advantageous if at least one of the softening point, melting point, or bondable temperature of the sealant (which is at least one of the first sealant or the second sealant) is equal to or lower than 300° C.

Also, the organic solvent to be mixed with the Cu-ZSM-5 type zeolite having a crystal size equal to or greater than 600 nm more preferably includes at least one selected from the group consisting of cyclooctane, cycloheptane, dimethylquinoline, α-pinene, β-pinene, pinane, α-pinene oxide, pinocarveol, caryophyllene, verbenone, isobornyl cyclohexanol, α-terpineol, β-terpineol, γ-terpineol, menthol, myrtenal, myrtenol, benzyl benzoate, dihydroterpineol, and dihydroterpineol acetate. Also, this advantage will be achieved particularly significantly if the process temperature of the glass panel unit is equal to or lower than 350° C., at which the solvent is less likely to desorb from the zeolite. That is to say, this is more advantageous if at least one of the softening point, melting point, or bondable temperature of the sealant (which is at least one of the first sealant or the second sealant) is equal to or lower than 350° C. This is even more advantageous if at least one of the softening point, melting point, or bondable temperature of the sealant (which is at least one of the first sealant or the second sealant) is equal to or lower than 300° C.

Furthermore, the organic solvent to be mixed with the Cu-ZSM-5 type zeolite having a crystal size equal to or greater than 750 nm more preferably includes at least one selected from the group consisting of cyclooctane, cycloheptane, dimethylquinoline, α-pinene, β-pinene, pinene, α-pinene oxide, pinocarveol, caryophyllene, verbenone, isobornyl cyclohexanol, α-terpineol, β-terpineol, γ-terpineol, menthol, myrtenal, myrtenol, benzyl benzoate, dihydroterpineol, and dihydroterpineol acetate. Also, this advantage will be achieved particularly significantly if the process temperature of the glass panel unit is equal to or lower than 350° C., at which the solvent is less likely to desorb from the zeolite. That is to say, this is more advantageous if at least one of the softening point, melting point, or bondable temperature of the sealant (which is at least one of the first sealant or the second sealant) is equal to or lower than 350° C. This is even more advantageous if at least one of the softening point, melting point, or bondable temperature of the sealant (which is at least one of the first sealant or the second sealant) is equal to or lower than 300° C.

Also, it is preferable that the solvent of the getter material composition include an organic solvent having a boiling point equal to or lower than 300° C. This makes easier, even at low temperatures, to remove the organic solvent from the getter material composition and form the gas adsorbent 60.

As can be seen, it is advantageous that at least one of the softening point, melting point, or bondable temperature of the sealant is equal to or lower than 300° C. and the crystal size of the zeolite is equal to or greater than 200 nm. The crystal size of the zeolite is more preferably equal to or greater than 300 nm, even more preferably equal to or greater than 400 nm, particularly preferably equal to or greater than 400 nm, and more particularly preferably equal to or greater than 500 nm, and yet more preferably equal to or greater than 600 nm. It is even better that the crystal size of the zeolite is equal to or greater than 750 nm, equal to or greater than 1000 nm, equal to or greater than 1500 nm, or equal to or greater than 2000 nm.

The getter material may include not only a plurality of particles of a zeolite crystal, but also a plurality of particles of a carbon dioxide adsorbent. In that case, a composite getter material with excellent carbon dioxide adsorption performance may be obtained. Examples of such particles of a carbon dioxide adsorbent include alumina such as $\gamma\text{-}Al_2O_3$, zinc oxide, silica, titania, a platinum group such as platinum, lithium silicate, activated carbon, calcium oxide, calcium hydroxide, magnesium oxide, magnesium hydroxide, sodium hydroxide, yttrium oxide, metal complexes such as a cobalt complex, and cerium compounds such as cerium oxide and cerium hydroxide. A particle made of any of these carbon dioxide adsorbents serves as a $CO_2$ adsorbent. This allows $CO_2$ released from the organic solvent to be adsorbed into the carbon dioxide adsorbent, thus reducing the chances of carbon dioxide being adsorbed into the zeolite particle. This may reduce the chances of the function of a particle of a zeolite crystal being disturbed by carbon dioxide. In addition, a similar advantage would be achieved by a getter material in which a zeolite particle that has been ion-exchanged with a metal having a higher carbon dioxide adsorption performance than Cu-ZSM-5 and different from Cu-ZSM-5 (such as Ba, Sr, Pt, Pd, or Ru) or a particle having a different crystal structure from Cu-ZSM-5 (such as a zeolite 13X particle or a type A zeolite particle) and Cu-ZSM-5 are mixed.

In addition, it is also preferable that the getter material include a hydrogenation catalyst. The hydrogenation catalyst is a catalyst that triggers a hydrogenation reaction. As used herein, the "hydrogenation reaction" refers to a reaction that causes, using a hydrogen gas as a reducing agent, a hydrogen atom to be added to a multiple-bond site such as a carbon-carbon bond of a compound (such as hydrocarbon) of an organic solvent, for example. Such a reaction is readily produced when a compound and a metallic catalyst are brought into contact with each other.

In this embodiment, the hydrogenation catalyst may be a generally known one, examples of which include a platinum group such as ruthenium, rhodium, platinum, and palladium, metals such as nickel, cobalt, molybdenum, tungsten, iron, copper, titanium, zirconium, and aluminum, or compounds such as oxides thereof. Adding any of these to the getter material enables promoting vaporization of the organic solvent to make the organic solvent easily removable in the sealing step and decomposing hydrocarbon into $H_2$, $CO_2$, $H_2O$, or any other hydrocarbon with a higher degree of reactivity. This allows the decomposed molecules to be removed either by vaporization or adsorption into the getter material. Particularly when the getter material and the organic solvent are mixed, this makes it much easier to remove unnecessary hydrocarbon, thus achieving a significant advantage. Optionally, the hydrogenation catalyst may also be supported by, or added to, another substance. Alternatively, a powder of a metal (e.g., a platinum group such as platinum black or palladium black) may be mixed as either a metallic porous body or a powder, of which the size is equal to or less than a single micrometer.

Note that the catalytic support on which the hydrogenation catalyst is supported is preferably a porous body. The porous body preferably has a specific surface area equal to or greater than 20 $m^2/g$ and more preferably has a specific surface area equal to or greater than 50 $m^2/g$. Alternatively, the porous body may also be supported by the carbon dioxide adsorbent described above. Nevertheless, if a copper ion-exchanged zeolite is used as the zeolite, then the copper ion-exchanged zeolite has the property of being activated by having copper reduced in a vacuum and expressing a powerful adsorption capability. In that case, a carbon dioxide adsorbent other than cerium oxide is preferably used. A significant advantage will also be achieved even when cerium oxide is used. Meanwhile, if a substance having an oxygen storage property such as cerium oxide or a ceria-zirconia solid solution and the copper ion-exchanged zeolite are mixed, then oxygen released from the cerium oxide or the ceria-zirconia solid solution may inhibit the activation of the copper ion-exchanged zeolite and sometimes cause a decline in its performance. In addition, cerium may react with the silica part of the zeolite to cause deterioration in the copper ion-exchanged zeolite. Furthermore, the use of cerium, which is one of precious rare-earth metals, is preferably minimized in terms of the cost and the stability of production. For these reasons, the catalytic support for the hydrogenation catalyst is particularly preferably at least one selected from the group consisting of alumina, silica, activated carbon, and barium sulfate. Furthermore, the catalytic support for the hydrogenation catalyst is particularly preferably an Al compound such as alumina or an Si compound such as silica because these compounds have the same metal component as the zeolite. Furthermore, the catalytic support for the hydrogenation catalyst preferably has a mean particle size equal to or greater than 1 nm and equal to or less than 50 μm. Note that the mean particle size of the catalytic support for the hydrogenation catalyst may be checked by observation through an SEM. Furthermore, the ratio by mass of the hydrogenation catalyst to the catalytic support is preferably equal to or greater than 0.01% by weight and equal to or less than 30% by weight in terms of the use efficiency of the hydrogenation catalyst.

The catalytic support on which the hydrogenation catalyst is supported may be at least one porous substance selected from the group consisting of, for example, alumina, silica, activated carbon, barium sulfate, calcium carbonate, silicon carbide, titanium oxide, and zirconium oxide. Among other things, porous alumina is particularly preferred because porous alumina has carbon dioxide adsorption capability in itself. If the hydrogenation catalyst is supported on cerium oxide or if cerium oxide is mixed as a carbon dioxide adsorbent with the getter material, then the content of the cerium oxide is preferably at most 30 wt % of the entire getter material. The content of the cerium oxide is more preferably equal to or less than 15 wt %, even more preferably equal to or less than 5 wt %, and particularly preferably equal to or less than 1 wt %.

Examples of preferred combinations of a hydrogenation catalyst and a catalytic support include $Ru/Al_2O_3$, $Rh/Al_2O_3$, $Pt/Al_2O_3$, $Pd/Al_2O_3$, $Ir/Al_2O_3$, $Os/Al_2O_3$, $Au/Al_2O_3$, $Ni/Al_2O_3$, $Co/Al_2O_3$, $Mo/Al_2O_3$, $W/Al_2O_3$, $Fe/Al_2O_3$, $Cu/Al_2O_3$, $Ti/Al_2O_3$, $Zr/Al_2O_3$, $Al/Al_2O_3$, $Ru/SiO_2$, $Rh/SiO_2$, $Pt/SiO_2$, $Pd/SiO_2$, $Ir/SiO_2$, $Os/SiO_2$, $Au/SiO_2$, $Ni/SiO_2$, $Co/SiO_2$, $Mo/SiO_2$, $W/SiO_2$, $Fe/SiO_2$, $Cu/SiO_2$, $Ti/SiO_2$, $Zr/SiO_2$, $Al/SiO_2$, Ru/C, Rh/C, Pt/C, Pd/C, Ir/C, Os/C, Au/C, Ni/C, Co/C, Mo/C, W/C, Fe/C, Cu/C, Ti/C, Zr/C, and Al/C, where C indicates activated carbon. Note that each of these combinations enumerated above is indicated in the form of A/B: hydrogenation catalyst/catalytic support.

Among other things, if a substance including a platinum group, gold, or a compound thereof is supported on a porous cerium such as alumina or silica as in $Ru/Al_2O_3$, $Rh/Al_2O_3$, $Pt/Al_2O_3$, $Pd/Al_2O_3$, $Au/Al_2O_3$, $Ru/SiO_2$, $Rh/SiO_2$, $Pt/SiO_2$, $Pd/SiO_2$, or $Au/SiO_2$ as the combination of the hydrogenation catalyst and the catalytic support, then oxidation and reduction will be caused with a high degree of stability and particularly good properties will be exhibited when the combination of the hydrogenation catalyst and the catalytic support is used along with the copper ion-exchanged zeolite.

On the other hand, a catalyst such as silver or silver oxide, which is oxidized in the air at a temperature equal to or lower than 350° C. and reduced in a vacuum at a temperature equal to or lower than 350° C. to release a lot of oxygen, inhibits the activation of the copper ion-exchanged zeolite. Therefore, it is preferable to avoid mixing a substance having such a property with the copper ion-exchanged zeolite as much as possible. For example, the content of a substance having such a property with respect to the entire getter material is preferably at most less than 5 wt %, more preferably equal to or less than 1 wt %, and even more preferably equal to or less than 0.1 wt %.

The hydrogenation catalytic supported on the catalytic support is preferably a powder, of which the particle size is smaller than that of the zeolite particle or a particle of the carbon dioxide adsorbent. Examples of the hydrogenation catalyst powders include ruthenium 5 wt %-alumina powder (product code JAN4987481323469), platinum 5 wt %-alumina powder (product code JAN4987481317161), and palladium 5 wt %-alumina powder (product code JAN4987481317109), all of which are manufactured by FUJIFILM Wako Pure Chemical Corporation, and 5 wt % Pd alumina powder (ID Code: AA-2501), 5 wt % Pd barium sulfate (ID Code: OP-2505), Pd black (BL-2901), 5 wt % Pt alumina powder (ID Code: AA-1501), Pt black (ID Code: BL-1901), and 5 wt % Ru alumina powder (ID Code: AA-4501), all of which are manufactured by N. E. Chemcat Corporation.

Next, specific examples will be described. A getter material composition was prepared by mixing 10 wt % of a hydrogenation catalyst powder and 90 wt % of a Cu-ZSM-5 powder having a crystal size of 400 nm and using α-terpineol as a solvent. A glass panel unit was made as a prototype using the getter material composition. As a result, the getter material composition consisting of only Cu-ZSM-5 had a thermal conductance of 12 $W/m^2K$. On the other hand, when a getter material composition was prepared by mixing 5 wt % of ruthenium, 10 wt % of an alumina powder, and 90 wt % of a Cu-ZSM-5 powder having a crystal size of 400 nm and using α-terpineol as a solvent, the thermal conductance was 0.87 $W/m^2K$.

Meanwhile, when a getter material composition was prepared by mixing 5 wt % of platinum, 10 wt % of an alumina powder, and 90 wt % of a Cu-ZSM-5 powder having a crystal size of 400 nm and using α-terpineol as a solvent, the thermal conductance was 0.78 $W/m^2K$. Also, when a getter material composition was prepared by mixing 5 wt % of palladium, 10 wt % of an alumina powder, and 90 wt % of a Cu-ZSM-5 powder having a crystal size of 400 nm and using α-terpineol as a solvent, the thermal conductance was 0.76 $W/m^2K$. Furthermore, a glass panel in which a getter material was prepared by mixing 10 wt % of an alumina powder with no hydrogenation catalyst and 90 wt % of a Cu-ZSM-5 powder having a crystal size of 400 nm had a thermal conductance of 2 $W/m^2K$. When the gases remaining in the glass panel that used a getter material mixed with alumina without a hydrogenation catalyst were analyzed, a lot of hydrocarbon-based gases were detected.

Furthermore, a glass panel in which a getter material was prepared by mixing 10 wt % of cerium oxide with no hydrogenation catalyst and 90 wt % of a Cu-ZSM-5 powder having a crystal size of 400 nm had a thermal conductance of 2.6 $W/m^2K$. An experiment was conducted in the same way by using, as a solvent, a mixture of 50 wt % of α-terpineol having a boiling point of 219° C. and 50 wt % of a high-boiling-point solvent (β-caryophyllene) having a boiling point of 260° C. In that case, when 5 wt % of ruthenium-alumina powder was used, the thermal conductance was 2.3 W/m$^2$K. When 5 wt % of platinum-alumina powder was used, the thermal conductance was 0.78 W/m$^2$K. When 5 wt % of palladium-alumina powder was used, the thermal conductance was 0.76 W/m$^2$K. When an alumina powder with no hydrogenation catalyst was used, the thermal conductance was 8.3 W/m$^2$K. As can be seen, when the solvent included a high-boiling-point solvent having a boiling point equal to or higher than 250° C., a more significant difference was recognized depending on whether the hydrogenation catalyst was included or not.

Furthermore, in a situation where the hydrogenation catalyst included a platinum group such as ruthenium, palladium, or platinum, relatively good thermal conductance was maintained even when a high-boiling-point solvent having a boiling point equal to or higher than 250° C. was used. As for palladium and platinum, among other things, the thermal conductance hardly changed depending on whether such a high-boiling-point solvent having a boiling point equal to or higher than 250° C. was used or not. That is why when the solvent includes a hardly vaporizable component such as a high-boiling-point solvent having a boiling point equal to or higher than 250° C. or a resin component, a hydrogenation catalyst such as a platinum group would bring about particularly beneficial effects. In addition, if such a high-boiling-point solvent having a boiling point equal to or higher than 250° C. or a resin component is mixed with the solvent, either palladium or platinum would bring about more beneficial effects. In a getter material containing no platinum group, on the other hand, the solvent to be mixed with the getter material more preferably includes, as a main component, a solvent having a boiling point lower than 250° C. (preferably includes more than 50 wt % of such a solvent).

Note that these thermal conductance values are comparative values on the supposition that the total amount of the respective getter material powders is constant. That is why a carbon dioxide adsorbent such as alumina adsorbs carbon dioxide released due to decomposition of an organic solvent particularly when a getter material is mixed with the organic solvent, thus achieving the advantage of keeping the internal pressure of the glass panel low. In addition, the hydrogenation catalyst may also promote the vaporization of the organic solvent to make it removable more easily through the sealing step and may decompose a hydrocarbon-based gas, produced when the organic solvent turns into a gas, to have the hydrocarbon-based gas adsorbed into the zeolite, the carbon dioxide absorbent, or the hydrogenation catalyst itself. Thus, the hydrogenation catalyst achieves the advantage of reducing an increase in the internal pressure of the glass panel.

In addition, these advantages of the hydrogenation catalyst tend to be achieved more significantly when a high-boiling-point solvent or a resin component is used rather than when a low-boiling-point solvent is used. An organic solvent having a cyclic structure has a relatively large molecular weight, and therefore, tends to have a high boiling point. Thus, preparing a getter material composition by mixing an organic solvent having a cyclic structure, a zeolite, and the hydrogenation catalyst with each other enables appropriately removing the organic solvent after the application while minimizing the damage to be done by the organic solvent on the zeolite. This trend is observed more remarkably when the zeolite has a crystal size equal to or greater than 200 nm. The crystal size of the zeolite is preferably equal to or greater than 300 nm, more preferably equal to or greater than 400 nm, even more preferably equal to or greater than 500 nm, and particularly preferably equal to or greater than 600 nm.

Also, the crystal size (particle size) of the zeolite is more preferably equal to or greater than 750 nm, even more preferably equal to or greater than 1000 nm, and particularly preferably equal to or greater than 1500 nm or equal to or greater than 2000 nm. Note that such a high-boiling-point solvent having a boiling point equal to or higher than 250° C. or a resin component generally has high viscosity. Thus, mixing such a high-boiling-point solvent or a resin component enables more effectively reducing the sedimentation of the getter material composition and increasing the stability of application. Examples of such a high-boiling-point solvent include β-caryophyllene, benzyl benzoate, and isobornyl cyclohexanol. Examples of such a resin component include polycarbonate, acrylic resin, polyester, polyurethane, and phenolic resin. That is to say, any of solvents and resin binders which are generally used for the purpose of screen printing, for example, may be adopted. At least one of these solvents and resin components may be adopted.

As can be seen from the foregoing description, using a zeolite, a carbon dioxide absorbent, and a hydrogenation catalyst in combination enables providing a high-performance getter material composition and getter material while checking a decline in the performance even when these materials are mixed with an organic solvent. Meanwhile, since the carbon dioxide absorbent and the hydrogenation catalyst are not suitable to adsorbing nitrogen, the zeolite is preferably a copper ion-exchanged zeolite, in particular, and more preferably a ZSM-5 type. Note that the same advantages will be achieved to a certain degree even when only the zeolite and the carbon dioxide absorbent are used in combination or when only the zeolite and the hydrogenation catalyst are used in combination, for example. Also, it is effective to use the zeolite, the carbon dioxide absorbent, and the hydrogenation catalyst in combination to adsorb hydrocarbon-based gases and carbon dioxide released from the sealant, the glass substrates, the pillars, and other members.

In this embodiment, the getter material may consist of zeolite particles alone. In that case, 100 wt % of the particles that form the getter material is the zeolite particles.

Alternatively, in this embodiment, the getter material may also be a mixture of zeolite particles and particles of the carbon dioxide adsorbent. In that case, the getter material preferably contains the zeolite particles and the particles of the carbon dioxide adsorbent at a ratio by weight of 1 (zeolite particles) to 0.01-0.99 (particles of the carbon dioxide adsorbent).

Still alternatively, in this embodiment, the getter material may also be a mixture of zeolite particles and a powder of the hydrogenation catalyst. In that case, the getter material preferably contains the zeolite particles and the powder of the hydrogenation catalyst at a ratio by weight of 1 (zeolite particles) to 0.0001-0.3 (powder of the hydrogenation catalyst).

Yet alternatively, in this embodiment, the getter material may also be a mixture of zeolite particles, particles of the carbon dioxide adsorbent, and a powder of the hydrogenation catalyst. In that case, the getter material preferably contains the zeolite particles, the particles of the carbon dioxide adsorbent, and the powder of the hydrogenation catalyst at a ratio by weight of 1 (zeolite particles) to 0.01-0.99 (particles of the carbon dioxide adsorbent) to 0.0001-0.3 (powder of the hydrogenation catalyst).

Furthermore, in this embodiment, the getter material composition preferably contains the getter material and the solvent in predetermined proportions. For example, the getter material composition preferably contains the getter material and the solvent at a ratio by weight of 1 (getter material) to 0.1-100 (solvent).

Furthermore, in this embodiment, the getter material composition preferably contains the getter material, the solvent, and the resin component in predetermined proportions. For example, the getter material composition preferably contains the getter material, the solvent, and the resin component at a ratio by weight of 1 (getter material) to 0.1-100 (solvent) to 0.01-2 (resin component).

Furthermore, in this embodiment, the getter material composition preferably contains the getter material, a solvent having a boiling point lower than 250° C., and a high-boiling-point solvent having a boiling point equal to or higher than 250° C. in predetermined proportions. For example, the getter material composition preferably contains the getter material, the solvent having a boiling point lower than 250° C., and the high-boiling-point solvent having a boiling point equal to or higher than 250° C. at a ratio by weight of 1 (getter material) to 0.1-100 (solvent having a boiling point lower than 250° C.) to 0.01-2 (high-boiling-point solvent having a boiling point equal to or higher than 250° C.).

Following is a summary of the advantages to be achieved by the hydrogenation catalyst added to the getter material and the getter material composition.

To form a getter material in a narrow gap of an evacuated glass panel unit (multi-pane glazing unit), for example, it is preferable that the getter material be mixed with a solvent and the mixture be applied onto the glass substrates. At this time, any application method such as dispensing, screen printing, slit coating, spray coating, or spin coating may be adopted as appropriate.

The advantages to be achieved by applying a mixture of a powder of the getter material and a solvent include: (1) enabling forming a thin film (e.g., to a thickness less than that of the sealant); (2) allowing the powder of the getter material to aggregate when dried and enabling reducing the apparent volume, compared to applying the powder of the getter material directly onto the glass substrates; (3) increasing the degree of freedom in the shape of glass substrates to be mass-produced; and (4) eliminating the need to use a member for fixing the getter material because the getter material adheres electrostatically onto the substrates when dried.

On the other hand, the disadvantages entailed include: (1) causing a failure in applying the getter material composition because using a solvent having a low boiling point causes the solvent to be dried either during storage or application step of the getter material composition; (2) failing to maintain sufficient stability in application because the powder of the getter material would be sedimented unless a solvent having a relatively high viscosity is used; (3) requiring huge energy to desorb the solvent molecules once the solvent molecules are adsorbed into the getter material, particularly when a high-viscosity solvent, which generally has a high boiling point, is mixed with a getter material having the property of adsorbing gases; (4) causing a significant decline in the adsorption performance of the getter material (and further causing the solvent molecules to be released as a gas from the getter material and possibly causing an increase in the quantity of gases remaining in the glass panel unit to the contrary) unless the solvent is desorbed sufficiently after the application.

That is to say, using a solvent having a high boiling point to enable the solvent to be applied with stability makes it difficult to sufficiently desorb the solvent, thus causing a decline in the adsorption performance of the getter material, which is a problem. In particular, the lower the process temperature of the glass panel unit is, the more difficult it is to sufficiently desorb the solvent and the more likely a decline will be caused in performance, after the getter material composition has been applied. In addition, even if a certain organic solvent is heated to its boiling point, for example, actually the solvent will not be vaporized completely. In particular, when the organic solvent is mixed with Cu-ZSM-5, the solvent molecules will not be desorbed completely unless the solvent is heated to a temperature higher than the boiling point by 100-150° C. A few organic solvents may be vaporized completely at a temperature equal to or lower than 350° C. That is why this is a serious problem particularly when the process temperature is equal to or lower than 350° C. or when either the softening point or melting point of the sealant (which is at least one of the first sealant or the second sealant) is equal to or lower than 350° C.

The getter material composition that has been applied goes through: (A) desorption of its organic solvent when the getter material composition is heated in a drying step or a sealing step (e.g., the first melting step) after that; (B) activation of its getter material when the getter material composition is heated in a vacuum; and (C) release of (mostly) carbon dioxide, nitrogen, methane, and other gases from inside the assembly 100 that has been separated from the vacuum pump and adsorption of those gases into the getter material (e.g., after the second melting step). The copper ion-exchanged zeolite is allowed to achieve its advantages in the stages (A) and (C) by mixing the hydrogenation catalyst with the copper ion-exchanged zeolite.

First, in the stage (A), the hydrogenation catalyst vaporizes the organic solvent by promoting its decomposition and reaction, thereby reducing the chances of the organic solvent remaining in the copper ion-exchanged zeolite to cause a decline in its performance. Furthermore, in the stage (C), the hydrogenation catalyst (e.g., a platinum group catalyst, in particular) also serves as a powerful carbon dioxide absorbent or hydrocarbon-based gas adsorbent with chemical adsorption properties. Thus, compared to a situation where either only a copper ion-exchanged zeolite or only a hydrogenation catalyst is used as the getter material to prevent adsorption sites of the copper ion-exchanged zeolite that may adsorb nitrogen and methane gases as well from being filled with carbon dioxide, a getter material as a mixture of the copper ion-exchanged zeolite and the hydrogenation catalyst may adsorb not only carbon dioxide but also more nitrogen and methane gases as well, thus eventually enabling keeping the residual gas pressure of the glass panel unit low enough.

This advantage will be achieved even more significantly when the process temperature is equal to or lower than 350° C. (i.e., under such a condition that makes it less easy to desorb the organic solvent and activate the copper ion-exchanged zeolite sufficiently). That is to say, this advantage becomes even more remarkable when the sealant (which is at least one of the first sealant or the second sealant) has a softening point or melting point equal to or lower than 350° C. Meanwhile, when combined with Cu-ZSM-5, the organic solvent preferably includes a cyclic compound. Nevertheless, generally speaking, a cyclic compound often has a high boiling point. Using Cu-ZSM-5, the solvent including an organic solvent, and the hydrogenation catalyst in combination enables providing a getter material composition that exhibits not only sufficient adsorption performance but also good stability in application as well.

A getter material composition that exhibits not only sufficient adsorption performance but also good stability in application may be provided by using Cu-ZSM-5, the solvent including an organic solvent, and the hydrogenation catalyst in combination. When combined with Cu-ZSM-5, the organic solvent preferably includes a cyclic compound. Nevertheless, generally speaking, a cyclic compound often has a high boiling point. Using a cyclic compound as the organic solvent reduces the chances of the organic solvent entering the inside of Cu-ZSM-5, thus allowing the hydrogenation catalyst to react with the organic solvent more smoothly and making it easier to achieve the advantages of the hydrogenation catalyst. Furthermore, making the crystal size of Cu-ZSM-5 equal to or greater than 400 nm, more preferably equal to or greater than 600 nm, and even more preferably 750 nm enables providing a getter material composition exhibiting even better adsorption performance in a low-pressure range by further reducing the deterioration that would otherwise be caused by the organic solvent. In addition, mixing Cu-ZSM-5 with a hydrogenation catalyst and an organic solvent including a cyclic compound enables decreasing the proportion of the organic solvent inside the Cu-ZSM-5 crystal and promoting the reaction between the organic solvent and the hydrogenation catalyst, thus making it easier to desorb the solvent even more effectively.

An exemplary getter material may include 51 wt % to 99 wt % of a copper ion-exchanged zeolite having a crystal size equal to or greater than 400 nm and equal to or less than 5000 nm and 1 wt % to 49 wt % of a porous powder on which a hydrogenation catalyst is supported (and in which the proportion by weight of the hydrogenation catalyst to the entire porous powder is equal to or greater than 0.1 wt % and equal to or less than 20 wt %). The getter material more preferably includes 51 wt % to 99 wt % of Cu-ZSM-5 having a crystal size equal to or greater than 400 nm and equal to or less than 5000 nm and 1 wt % to 49 wt % of a porous powder on which a hydrogenation catalyst is supported (and in which the proportion by weight of the hydrogenation catalyst to the entire porous powder is equal to or greater than 0.1 wt % and equal to or less than 20 wt %). Alternatively, the getter material may include 51 wt % to 99 wt % of a copper ion-exchanged zeolite having a crystal size equal to or greater than 400 nm and equal to or less than 5000 nm and 1 wt % to 49 wt % of a hydrogenation catalyst powder.

Also, an exemplary getter material composition may include 20 wt % to 60 wt % of a copper ion-exchanged zeolite having a crystal size equal to or greater than 400 nm and equal to or less than 5000 nm, 0.5 wt % to 40 wt % of a porous powder on which a hydrogenation catalyst is supported (and in which the proportion by weight of the hydrogenation catalyst to the entire porous powder is equal to or greater than 0.1 wt % and equal to or less than 20 wt %), and 30 wt % to 95 wt % of an organic solvent. The getter material composition more preferably includes 20 wt % to 60 wt % of Cu-ZSM-5 having a crystal size equal to or greater than 400 nm and equal to or less than 5000 nm, 0.5 wt % to 40 wt % of a porous powder on which a hydrogenation catalyst is supported (and in which the proportion by weight of the hydrogenation catalyst to the entire porous powder is equal to or greater than 0.1 wt % and equal to or less than 20 wt %), and 30 wt % to 95 wt % of an organic solvent, of which the main component is a cyclic compound (in that case, 50 wt % or more of the organic solvent is a cyclic compound). Alternatively, the getter material composition may include 20 wt % to 60 wt % of a copper ion-exchanged zeolite having a crystal size equal to or greater than 400 nm and equal to or less than 5000 nm, 0.1 wt % to 40 wt % of a powder of the hydrogenation catalyst, and 30 wt % to 95 wt % of an organic solvent.

After the mixing step, the assembling step is performed.

The assembling step is the step of preparing the assembly 100.

As shown in FIGS. 1A and 1B, the assembly 100 includes the first glass pane 200, the second glass pane 300, the peripheral wall 410, and a partition 420. The assembly 100 further has the internal space 500 surrounded with the first and second glass panes 200, 300 and the peripheral wall 410. The assembly 100 further includes the gas adsorbent 60 and a plurality of pillars (spacers) 70 in the internal space 500. The assembly 100 further has the exhaust port 700.

The first glass pane (first glass substrate) 200 is a member that forms the basis of a first glass pane 20 to be described later and is made of the same material as the first glass pane 20. The second glass pane (second glass substrate) 300 is a member that forms the basis of a second glass pane 30 to be described later and is made of the same material as the second glass pane 30. The first and second glass panes 200, 300 have the same planar shape. In this embodiment, the first glass pane 200 has dimensions that are large enough to form at least one first glass pane 20 to be described later, and the second glass pane 300 has dimensions that are large enough to form at least one second glass pane 30 to be described later.

The first and second glass panes 200, 300 each have a polygonal flat plate shape (e.g., a rectangular shape in this embodiment).

The first glass pane 200 includes a body 210 and a low-emissivity film 220.

The low-emissivity film 220 is provided in the internal space 500 and covers the body 210. The low-emissivity film 220 is in contact with the body 210. The low-emissivity film 220 is also called an "infrared reflective film" and has light-transmitting properties but reflects an infrared ray. Thus, the low-emissivity film 220 may improve the thermal insulation properties of the glass panel unit 10. The low-emissivity film 220 may be a thin metallic film, for example. The low-emissivity film 220 may contain silver, for example. The low-emissivity film 220 may be a Low-E film, for example.

The first glass pane 200 includes the body 210 as described above. The body 210 has a first surface 211 and a second surface 212. The first surface 211 is a flat surface and covered with the low-emissivity film 220. The second surface 212 is a flat surface parallel to the first surface 211 and is located opposite from the internal space 500 in the direction D1. The body 210 defines the main shape of the first glass pane 200, and therefore, has a rectangular flat plate shape. Examples of materials for the body 210 include soda lime glass, high strain point glass, chemically tempered glass, alkali-free glass, quartz glass, Neoceram, and thermally tempered glass. The first glass pane 200 may have a thickness of 0.1 mm to 20 mm.

The second glass pane 300 includes a body 310. The body 310 has a first surface 311 and a second surface 312. The first surface 311 is a flat surface facing the low-emissivity film 220. The second surface 312 is a flat surface parallel to the first surface 311 and is located opposite from the internal space 500 in the direction D1. The body 310 defines the main shape of the second glass pane 300, and therefore, has a rectangular flat plate shape. The body 310 has the same shape as the body 210. In this embodiment, the second glass pane 300 consists of the body 310 alone. Optionally, the second glass pane 300 may include not only the body 310 but also a low-emissivity film corresponding to the low-emissivity film 220. If the second glass pane 300 includes a low-emissivity film, then the low-emissivity film covers, and is in contact with, the body 310 in the internal space 500. Examples of materials for the body 310 include soda lime glass, high strain point glass, chemically tempered glass, alkali-free glass, quartz glass, Neoceram, and thermally tempered glass. The second glass pane 300 may have a thickness of 0.1 mm to 20 mm.

The peripheral wall 410 contains a first sealant (i.e., a first hot glue). The peripheral wall 410 is disposed between the first glass pane 200 and the second glass pane 300. The peripheral wall 410 has a frame shape as shown in FIG. 1A. Particularly, the peripheral wall 410 has a rectangular frame shape. The peripheral wall 410 is formed along the respective outer peripheries of the first and second glass panes 200, 300. Thus, in the assembly 100, the internal space 500 is created to be surrounded with the peripheral wall 410, the first glass pane 200, and the second glass pane 300.

The first hot glue may include a glass frit, for example. The glass frit may be a low-melting glass frit, for example. Examples of the low-melting glass frits include a bismuth-based glass frit, a lead-based glass frit, and a vanadium-based glass frit. In this embodiment, the first hot glue is configured as a vanadium-based glass frit. The first hot glue does not have to be a glass frit but may also be a low-melting metal or a hot-melt adhesive, for example. Optionally, the first hot glue may further contain either an organic binder or an organic solvent or both an organic binder and an organic solvent. In that case, even if a gas derived from the organic binder and/or the organic solvent is released into the evacuated space 50 after the sealing step (second melting step), the gas will be adsorbed into the gas adsorbent 60, thus reducing the chances of the gas remaining in the evacuated space 50.

The organic binder may include a resin, for example. Examples of the resin include poly(isobutyl methacrylate), ethyl cellulose, aliphatic polycarbonate, acrylic resin, and butyral resin. The organic binder does not have to be one of these resins but may include any arbitrary component as well. In any case, the resin constituting the organic binder is preferably a resin which has a low molecular weight and which may be easily decomposed.

Examples of the organic solvent include esters such as butyl carbitol acetate and ethyl carbitol acetate. However, the organic solvent does not have to be one of these components but may also include at least one solvent selected from the group consisting of a solvent such as a terpene-based solvent for use in general screen printing and a solvent for use in dispense application.

If the peripheral wall 410 further contains a resin, even a gas derived from the resin and released into the internal space 500 after the assembling step will also be exhausted in the gas exhausting step. In addition, even if the gas derived from the resin still remains as residual gas in the evacuated space 50 after the gas exhausting step, the residual gas may also be adsorbed into the gas adsorbent 60.

The partition 420 is placed in the internal space 500. The partition 420 partitions the internal space 500 into a first space 510 and a second space (ventilation space) 520. Thus, the first space 510 is a space from which a gas is exhausted in the gas exhausting step. The second space 520 is a space for use to exhaust the gas from the first space 510. The partition 420 is provided closer to a first end (i.e., the right end in FIG. 1A) along the length (i.e., the rightward/leftward direction in FIG. 1A) of the second glass pane 300 than to the center of the second glass pane 300 such that the first space 510 has a larger area than the second space 520. The partition 420 is provided in the internal space 500 along the width (i.e., the upward/downward direction in FIG. 1A) of the second glass pane 300. Nevertheless, neither longitudinal end of the partition 420 is in contact with the peripheral wall 410. In this embodiment, the width of the second glass pane 300 is parallel to the direction D2 and the length of the second glass pane 300 is parallel to the direction D3.

The partition 420 includes a body portion (partition body portion) 421 that forms its body and blocking portions 422. The blocking portions 422 include a first blocking portion 4221 and a second blocking portion 4222. The body portion 421 extends linearly in the direction D2. The direction D2 may be aligned with, for example, the width of the second glass pane 300. Also, in the direction D2, both ends of the body portion 421 are out of contact with the peripheral wall 410. The first blocking portion 4221 is formed to extend from one of the two ends of the body portion 421 toward the second space 520 and the second blocking portion 4222 is formed to extend from the other end of the body portion 421 toward the second space 520. The one end of the body portion 421 may be a first end and the other end thereof may be a second end.

The partition 420 contains a second sealant (second hot glue). The second hot glue may be a glass frit, for example. The glass frit may be a low-melting glass frit, for example. Examples of the low-melting glass frits include a bismuth-based glass frit, a lead-based glass frit, and a vanadium-based glass frit. In this embodiment, the second hot glue is configured as a vanadium-based glass frit. The second hot glue does not have to be a glass frit but may also be a low-melting metal or a hot-melt adhesive, for example. In this embodiment, the same type of glue is used as the first and second hot glues. That is to say, the first and second sealants are the same material.

Air passages 600 allow the first space 510 and the second space 520 to communicate with each other in the internal space 500 as shown in FIG. 1A. The air passages 600 include a first air passage 610 and a second air passage 620. The first air passage 610 is a gap between the first end (i.e., the upper end in FIG. 1A) of the partition 420 and the peripheral wall 410. The second air passage 620 is a gap between the second end (i.e., the lower end in FIG. 1A) of the partition 420 and the peripheral wall 410.

The exhaust port 700 is a hole that allows the second space 520 to communicate with the external environment. The exhaust port 700 is used to exhaust a gas from the first space 510 through the second space 520 and the air passages 600 (namely, the first air passage 610 and the second air passage 620). Thus, the air passages 600, the second space 520, and the exhaust port 700 together form an exhaust path for exhausting the gas from the first space 510. The exhaust port 700 is provided through the second glass pane 300 to allow the second space 520 to communicate with the external environment. Specifically, the exhaust port 700 is provided at a corner portion of the second glass pane 300.

The gas adsorbent 60 and the plurality of spacers 70 are arranged in the first space 510. In particular, the gas adsorbent 60 is formed along the width of the second glass pane 300 so as to be adjacent to a second end along the length (i.e., the left end in FIG. 1A) of the second glass pane 300. That is to say, the gas adsorbent 60 is placed at an end of the first space 510 (evacuated space 50). This makes the gas adsorbent 60 less conspicuous. In addition, the gas adsorbent 60 is located distant from the partition 420 and the air passage 600. This reduces the chances of the gas adsorbent 60 interfering with exhausting the gas from the first space 510.

The assembling step is the step of forming the first glass pane 200, the second glass pane 300, the peripheral wall 410, the partition 420, the internal space 500, the air passages 600, the exhaust port 700, the gas adsorbent 60, and the plurality of spacers 70 to obtain the assembly 100. The assembling step includes the following first to sixth steps. Optionally, the order in which the second to fifth steps are performed may be changed as appropriate.

The first step is the step of forming the first glass pane 200 and the second glass pane 300 (i.e., a substrate forming step). For example, the first step includes making the first glass pane 200 and the second glass pane 300. If necessary, the first step may further include cleaning the first glass pane 200 and the second glass pane 300.

The second step is the step of forming the exhaust port 700. The second step includes providing the exhaust port 700 through the second glass pane 300. If necessary, the second step includes cleaning the second glass pane 300.

Figure 3:
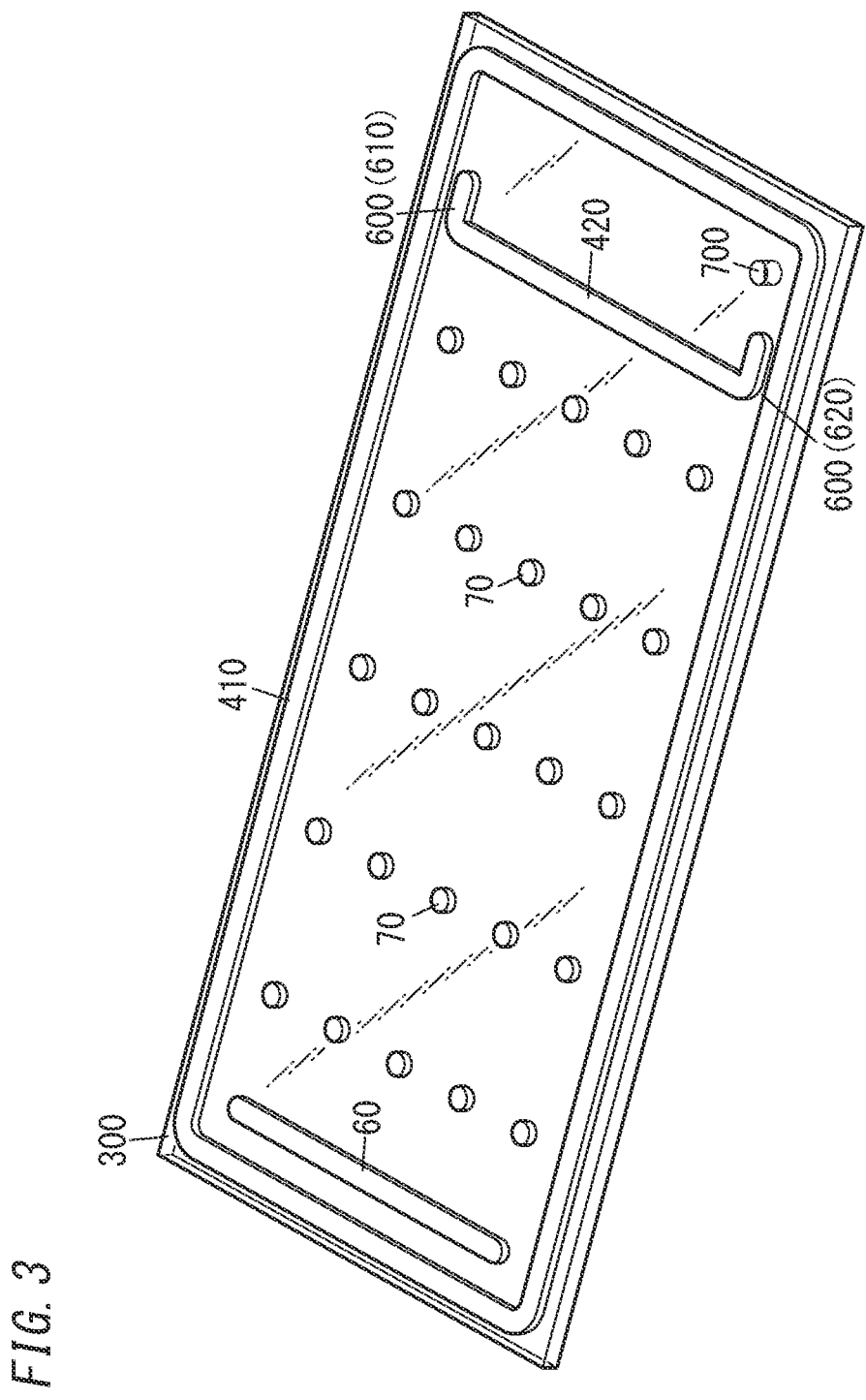
FIG. 3 illustrates a step of a method for manufacturing a glass panel unit according to the first embodiment.

The third step is the step of forming the spacers 70 (spacer forming step) (see FIG. 3). The third step includes forming a plurality of spacers 70 in advance and placing, using a chip mounter or any other tool, the plurality of spacers 70 at predetermined positions on the second glass pane 300. The plurality of spacers 70 will be used to maintain a predetermined gap distance between the first and second glass panes 200, 300 when the assembly 100 turns into a work in progress 110. Examples of constituent materials for such spacers 70 include metals, glass, and resins. The spacers 70 may contain one or a plurality of materials selected from these materials.

In the third step according to this embodiment, the spacers 70 are formed in advance and placed on the second glass pane 300 as described above. Alternatively, the plurality of spacers 70 may also be formed on the second glass pane 300 by a known thin film forming technique. Still alternatively, if the spacers 70 include a resin, the plurality of spacers 70 may also be formed by a combination of photolithography and etching techniques instead of the forming method described above. In that case, the plurality of spacers 70 may be made of a photocurable material, for example.

Note that the dimensions, number, spacing, and arrangement pattern of the spacers 70 may be selected appropriately. Each of the spacers 70 has the shape of a circular column, of which the height is approximately equal to the predetermined gap distance. For example, the spacers 70 may have a diameter of 0.5 mm, a height of 100 μm, and a spacing of 20 mm between themselves. Optionally, the spacers 70 may also have any other desired shape such as a rectangular columnar or spherical shape. Alternatively, the spacers 70 may also have, for example, a diameter of 0.1 mm to 5 mm, a height of 10 μm to 3000 μm, and a spacing of 2 mm to 100 mm between themselves.

The fourth step is the step of forming the gas adsorbent 60 (gas adsorbent forming step) (see FIG. 3). The fourth step includes forming the gas adsorbent 60 by applying, using a dispenser, for example, the getter material composition, prepared in the working step, onto the second glass pane 300 and then drying the getter material composition thus applied. That is to say, the fourth step includes a drying step of drying the getter material composition. Drying the getter material composition allows the getter material to recover its gas adsorptivity. In addition, applying the getter material composition enables reducing the size of the gas adsorbent 60. This allows the gas adsorbent 60 to be formed even in a narrow first space 510.

Next, an exemplary getter material composition application step will be described. Note that the application step to be described below is only an example and should not be construed as limiting.

First, either a hydrogenation catalyst or a porous powder on which the hydrogenation catalyst is supported is prepared. The powder of the hydrogenation catalyst or the porous powder is preferably pulverized as needed to have its particle size adjusted to 20 μm or less according to D50. Thereafter, 0.01 parts by mass to 49 parts by mass of the hydrogenation catalyst or the porous powder on which the hydrogenation catalyst is supported and 50 parts by mass to 99.99 parts by mass of a Cu-ZSM-5 powder having a crystal size equal to or greater than 400 nm and equal to or less than 5000 nm are mixed with each other and the mixture thus obtained is used as a getter material.

Next, 5 parts by mass to 70 parts by mass of the getter material 5 and 30 parts by mass to 95 parts by mass of the organic solvent are mixed with each other and the mixture thus obtained is used as a getter material composition. At this time, the organic solvent preferably includes a cyclic compound. In addition, adding a high-boiling-point solvent having a boiling point equal to or higher than 250° C. as the organic solvent may reduce the chances of the nozzle clogging, for example, due to drying of the solvent in an application head of an applicator.

The getter material composition is injected into a syringe such as a dispenser and then applied to the outer periphery of either the first glass pane or the second glass pane provided with a sealant or spacers. At this time, the application range is preferably within 15 mm from the edges of the glass substrates. In that case, the getter material will be hidden behind a sash when the glass panel unit is fitted into the sash. Note that the sealant, the spacers, and the getter material composition may be provided for the substrates in any order without limitation. For example, after the spacers have been placed, the getter material composition may be applied and then the sealant may be formed. Alternatively, the getter material composition, the spacers, and the sealant may be provided in this order.

Next, the glass substrates are subjected to the drying step, thereby partially drying the solvent of the getter material composition and causing the powder to adhere to the glass substrates. Thereafter, the first glass substrate and the second glass substrate are laid one on top of the other and the assembly is subjected to the sealing step to be described later. Alternatively, the sealant may be applied onto either the first glass pane or the second glass pane and then the assembly may be subjected to the drying step. After that, the getter material composition may be applied onto either the first glass pane or the second glass pane, and then the assembly may be subjected to the drying step again. This may prevent the getter material from adsorbing the volatile component of the solvent of the sealant and reduce the deterioration of the getter material. Nevertheless, higher productivity will be achieved by drying the sealant and the getter material simultaneously. The first melting step (to be described later) is performed in the air. During this process step, the residual solvent of the getter material composition is desorbed. The hydrogenation catalyst causes the effect of promoting desorption of the solvent during the first melting step. In addition, setting the crystal size of the Cu-ZSM-5 at 400 nm or more, preferably equal to or greater than 600 nm, and more preferably equal to or greater than 750 nm enables further reducing the effect of the solvent. Furthermore, adding a cyclic compound to the solvent enables further reducing the effect of the solvent. Note that at this point in time, the solvent has preferably been desorbed as much as possible from the getter material composition. Desorbing the solvent component sufficiently from the getter material composition allows the getter material composition to recover the state of the getter material again. Then, after the first glass substrate and the second glass substrate are bonded together in the first melting step, a gas exhausting step is performed next. During the gas exhausting step, the getter material is activated and comes to acquire adsorption capability.

Next, in the second melting step (to be described later), the glass panel unit 10 is sealed and separated from the vacuum pump. Thereafter, the gas released into the evacuated space 50 of the glass panel unit 10 is adsorbed into the getter material. At this time, the hydrogenation catalyst adsorbs silicon dioxide and hydrocarbon-based gas preferentially, thus enabling making adsorption sites of Cu-ZSM-5 available for use to adsorb nitrogen and methane gases. In addition, setting the crystal size of Cu-ZSM-5 at a value equal to or greater than 400 nm and preferably equal to or greater than 600 nm enables maintaining a better degree of vacuum in the low-pressure range.

The fifth step is the step of arranging the peripheral wall 410 and the partition 420 (sealant arrangement step) (see FIG. 3). The fifth step includes forming the peripheral wall 410 by applying, using a dispenser, for example, a first sealant onto the second glass pane 300 and then drying the first sealant. The fifth step also includes forming the partition 420 by applying, using a dispenser, for example, a second sealant onto the second glass pane 300 and then drying the second sealant.

By performing these first to fifth steps, the second glass pane 300 such as the one shown in FIG. 3 is obtained. On this second glass pane 300, the peripheral wall 410, the partition 420, the air passages 600, the exhaust port 700, the gas adsorbent 60, and the plurality of spacers 70 have been formed.

Figure 4:
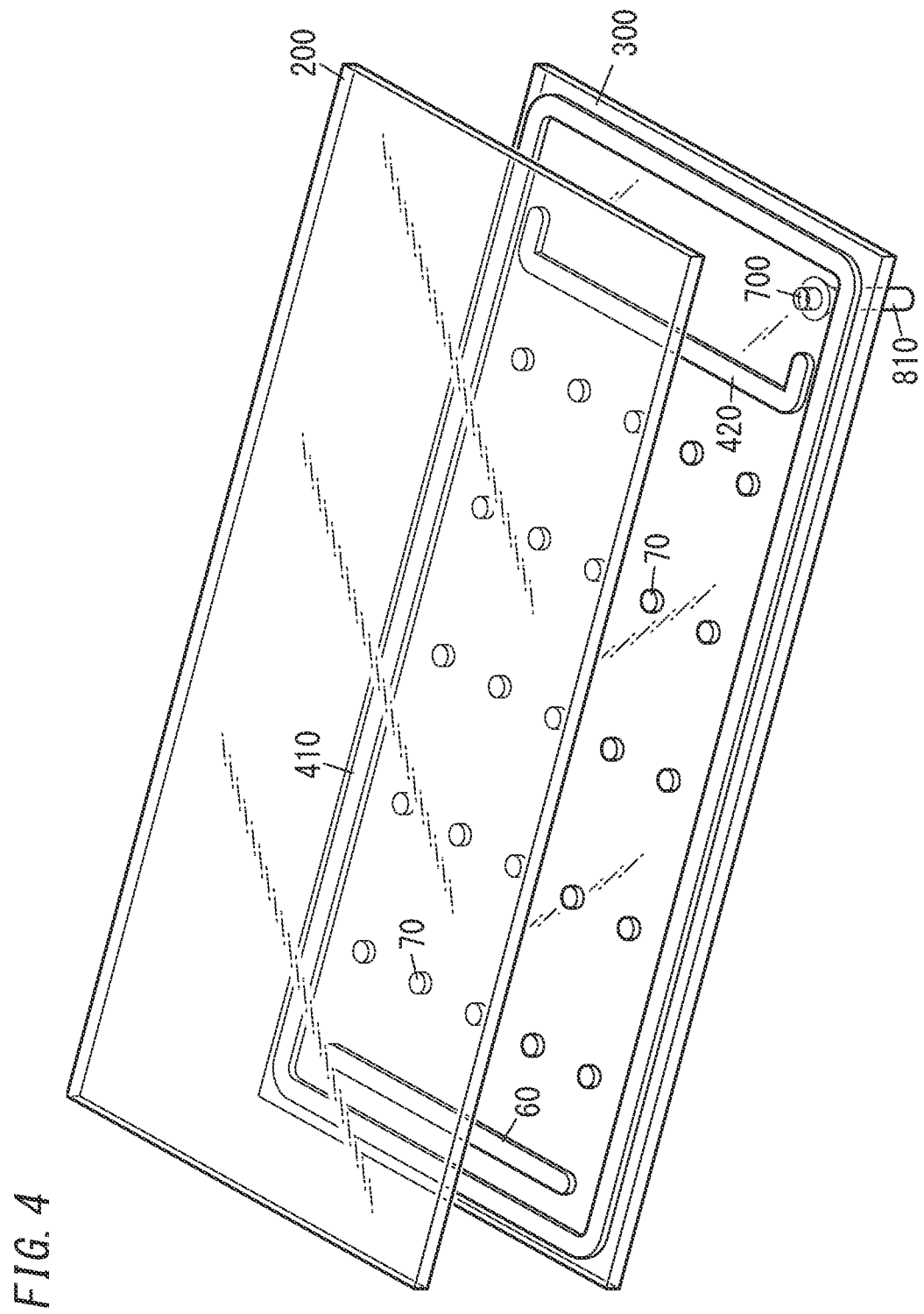
FIG. 4 illustrates another step of the method for manufacturing the glass panel unit according to the first embodiment.

The sixth step is the step of arranging the first glass pane 200 and the second glass pane 300 (arrangement step). In the sixth step, the first glass pane 200 and the second glass pane 300 are arranged to be parallel to each other and face each other as shown in FIG. 4.

The assembly 100 shown in FIG. 5 is obtained by performing this assembling step. After the assembling step has been performed, a first melting step (bonding step), a gas exhausting step, and a second melting step (sealing step) are carried out as shown in FIG. 6.

The first melting step is the step of melting the peripheral wall 410 once to hermetically bond the first glass pane 200 and the second glass pane 300 together with the peripheral wall 410. Specifically, the first glass pane 200 and the second glass pane 300 are loaded into a melting furnace and heated at a first melting temperature Tm1 for a predetermined time (first melting time) tm1 (see FIG. 6). In this embodiment, the first sealant and the second sealant are the same material as described above, and therefore, the softening point of the first sealant (first softening point) is the same as the softening point of the second sealant (second softening point). Thus, the first melting temperature Tm1 is set at a temperature equal to or higher than the first and second softening points. Even if the first melting temperature Tm1 is equal to or higher than the first and second softening points, the partition 420 does not close the air passages 600 in the first melting step because the gas exhausting step is started after the first melting step (see FIG. 6). That is to say, in the first melting step, the air passages 600 are still available. In the first melting step, if the first and second softening points are 265° C., the first melting temperature Tm1 may be set at 290° C., for example. The first melting time tm1 may be 15 minutes, for example.

In this embodiment, the implementation in which the first softening point is the same as the second softening point covers not only an implementation in which the first softening point is exactly the same as the second softening point but also an implementation in which the first softening point is approximately equal to the second softening point.

Heating the peripheral wall 410 at the first melting temperature Tm1 allows the peripheral wall 410 to be softened while reducing the deformation of the partition 420. This makes it easier to hermetically bond the first glass pane 200 and the second glass pane 300 with the peripheral wall 410.

The gas exhausting step is the step of exhausting a gas from the first space 510 through the air passages 600, the second space 520, and the exhaust port 700 to turn the first space 510 into an evacuated space 50. The gas may be exhausted using a vacuum pump, for example. The vacuum pump may be connected to the assembly 100 via an exhaust pipe 810 and a sealing head 820 as shown in FIG. 5. The exhaust pipe 810 may be bonded to the second glass pane 300 such that the inside of the exhaust pipe 810 and the exhaust port 700 communicate with each other, for example. Then, the sealing head 820 is attached to the exhaust pipe 810, thereby connecting a suction port of the vacuum pump to the exhaust port 700. The first melting step, the gas exhausting step, and the second melting step are performed with the assembly 100 kept loaded in the melting furnace. Therefore, the exhaust pipe 810 is bonded to the second glass pane 300 at least before the first melting step.

The gas exhausting step includes exhausting a gas from the first space 510 through the air passages 600, the second space 520, and the exhaust port 700 at a temperature equal to or higher than an exhaust temperature Te for a predetermined time (exhaust time) the or more before the second melting step is started (see FIG. 6). The exhaust temperature Te is set at a temperature lower than the second softening point (e.g., 265° C.) of the second sealant. The exhaust temperature Te may be 250° C., for example. This prevents the partition 420 from being deformed even in this gas exhausting step. During this gas exhausting step, at least water in the gas adsorbent 60 is vaporized and released into the first space 510. Then, the water is exhausted from the first space 510 through the air passages 600, the second space 520, and the exhaust port 700. Thus, exhausting the water released from the gas adsorbent 60 allows the getter material to further recover its gas adsorptivity. The exhaust time the is set to create an evacuated space 50 with a predetermined degree of vacuum (e.g., a degree of vacuum of 0.1 Pa or less). The exhaust time the may be set at 30 minutes, for example. Also, at this time, the activation temperature of the gas adsorbent 60 is the exhaust temperature Te. That is to say, a powder of the getter material is contained in the gas adsorbent 60 and the activatable temperature of the getter material is equal to or lower than the exhaust temperature Te.

The second melting step is the step of closing at least the air passages 600 by deforming the partition 420 to form a boundary wall 42 and thereby obtain a work in progress 110. That is to say, the second melting step includes closing the air passages 600 by deforming the partition 420. In other words, the first space 510 is closed by the partition 420 deformed so that the first space 510 and the second space 520 are separated from each other. In this manner, a frame member 40 surrounding the evacuated space 50 is formed (see FIG. 7). In this embodiment, the partition 420 is deformed such that both longitudinal ends of the partition 420 (namely, the first and second blocking portions 4221, 4222) come into contact with, and are integrated with, the peripheral wall 410. As a result, a boundary wall 42 is formed which hermetically separates the internal space 500 into the first space 510 (evacuated space 50) and the second space 520 as shown in FIG. 7. More specifically, melting the partition 420 once at a predetermined temperature (second melting temperature) Tm2 equal to or higher than the second softening point of the second sealant causes the partition 420 to be deformed. Specifically, the first glass pane 200 and the second glass pane 300 are heated in the melting furnace at the second melting temperature Tm2 for a predetermined time (second melting time) tm2 (see FIG. 6). The second melting temperature Tm2 and the second melting time tm2 are set such that the partition 420 is softened to close the air passages 600. The lower limit of the second melting temperature Tm2 is the second softening point (e.g., 265° C.). The second melting temperature Tm2 may be set at 300° C., for example. Also, the second melting time tm2 may be 30 minutes, for example. In this embodiment, the sealing step is the second melting step. In short, the sealing step is the step of spatially separating the evacuated space 50 from the other space. The space other than the evacuated space 50 corresponds to the second space 520 in this embodiment.

In this embodiment, the gas exhausting step is started after the first melting step and ends when the second melting step ends as shown in FIG. 6. Thus, during the second melting step, the gas is exhausted from the first space 510 through the air passages 600, the second space 520, and the exhaust port 700. This creates a pressure difference between the inside and outside of the assembly 100. This pressure difference causes the first and second glass panes 200, 300 to approach each other. Thus, the second melting step includes forming the boundary wall 42 that closes the air passages 600 by deforming the partition 420 at the second melting temperature Tm2 while exhausting a gas from the first space 510 through the air passages 600, the second space 520, and the exhaust port 700.

Also, in the second melting step shown in FIG. 6, after the second melting time tm2 has passed, the temperature inside the melting furnace is lowered to room temperature at a constant rate. Then, the sealing head 820 is removed to finish the second melting step and the gas exhausting step.

By performing these preparatory steps, the work in progress 110 shown in FIG. 7 is obtained. As shown in FIG. 7, the work in progress 110 includes the first glass pane 200, the second glass pane 300, the peripheral wall 41, and the boundary wall 42. In addition, the work in progress 110 also has the evacuated space 50 and the second space 520. The work in progress 110 further includes, in the evacuated space 50, the gas adsorbent 60 and the plurality of pillars (spacers) 70. The work in progress 110 further has the exhaust port 700.

The first and second glass panes 200, 300 each have a rectangular flat plate shape. The first and second glass panes 200, 300 have the same planar shape.

The boundary wall 42 (spatially) separates the evacuated space 50 from the second space 520. In other words, the second space 520 of the work in progress 110 (spatially) communicates with the external environment through the exhaust port 700, and therefore, the boundary wall 42 separates the evacuated space 50 from the external environment. The boundary wall 42 and the peripheral wall 410 together form the frame member 40 surrounding the evacuated space 50. The frame member 40 not only surrounds the evacuated space 50 entirely but also hermetically bonds the first and second glass panes 200, 300 together.

The gas adsorbent 60 is placed in the evacuated space 50. Specifically, the gas adsorbent 60 has an elongate flat-plate shape and is provided on the second glass pane 300. The gas adsorbent 60 is used to adsorb unnecessary gases (such as residual gases). The unnecessary gases may be, for example, the gas emitted from the hot glues (namely, the first and second hot glues) forming the frame member 40 when the hot glues are heated.

The plurality of spacers 70 are placed in the evacuated space 50. The plurality of spacers 70 is used to maintain a desired gap distance between the first and second glass panes 200, 300.

The evacuated space 50 is created by exhausting the gases from the first space 510 through the second space 520 and the exhaust port 700 as described above. In other words, the evacuated space 50 is the first space 510, of which the degree of vacuum is a predetermined value or less. The predetermined value may be 0.1 Pa, for example. The evacuated space 50 is perfectly closed hermetically by the first glass pane 200, the second glass pane 300, and the frame member 40, and therefore, is separated from the second space 520 and the exhaust port 700.

Figure 8:
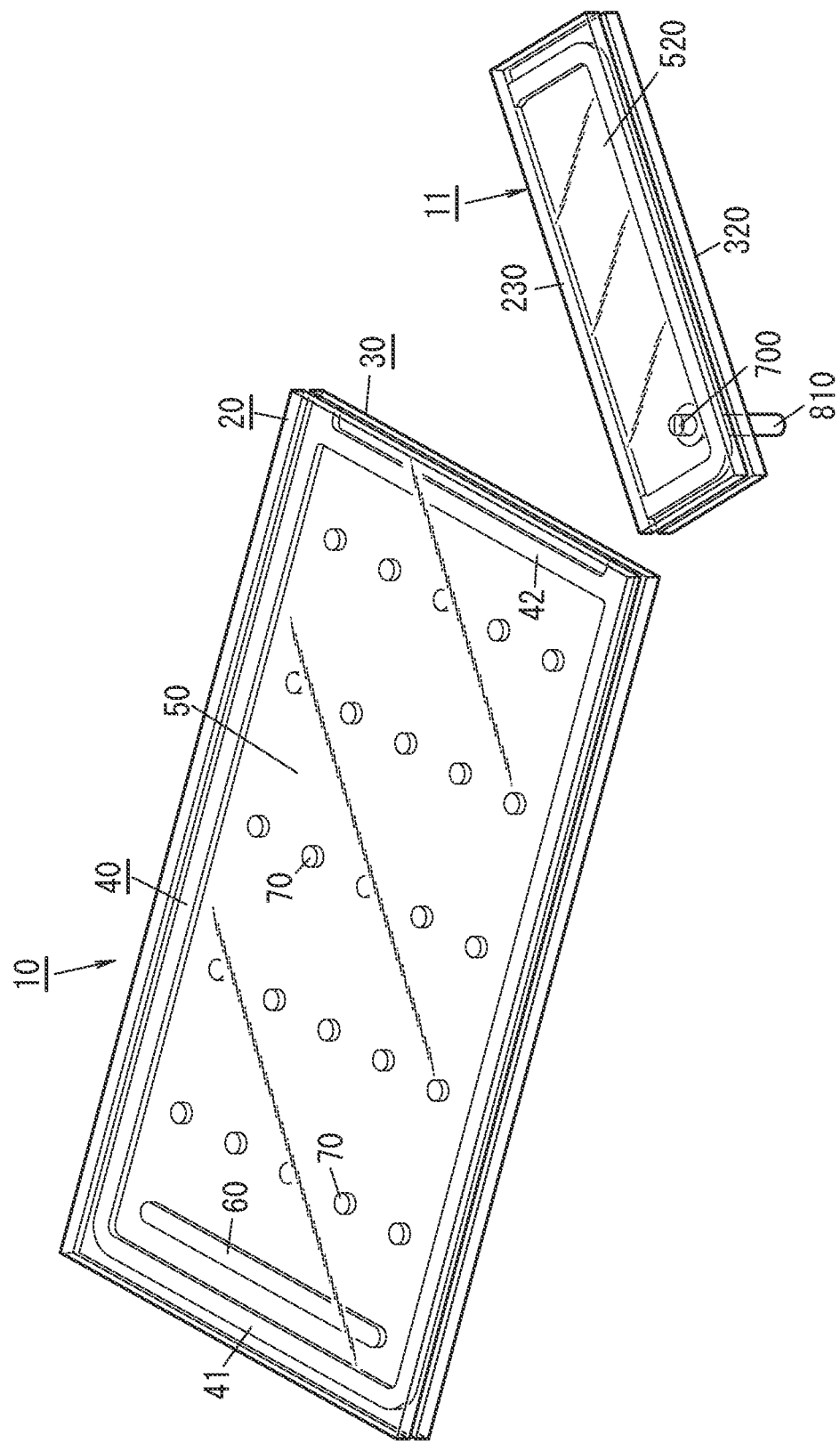
FIG. 8 illustrates yet another step of the method for manufacturing the glass panel unit according to the first embodiment.

The removing step is performed after the preparatory steps have been performed. The removing step is the step of removing a portion 11 having the second space 520 from the work in progress 110 to obtain the glass panel unit 10 as a part having the evacuated space 50 as shown in FIG. 8.

The glass panel unit 10 includes the first glass pane 20 and the second glass pane 30. The first glass pane 20 is a part, corresponding to the first space 510 (i.e., the evacuated space 50), of the first glass pane 200. The second glass pane 30 is a part, corresponding to the first space 510 (i.e., the evacuated space 50), of the second glass pane 300.

On the other hand, the unnecessary portion 11 includes a part 230, corresponding to the second space 520, of the first glass pane 200 and a part 320, corresponding to the second space 520, of the second glass pane 300. Note that the unnecessary portion 11 is preferably as small as possible, considering the manufacturing cost of the glass panel unit 10.

Specifically, in the removing step, the work in progress 110 unloaded from the melting furnace is cut off along the boundary wall 42 to be divided into a part (glass panel unit) 10 having the evacuated space 50 and a part (unnecessary portion) 11 having the second space 520. Note that the shape of the portion where the work in progress 110 is cut off (i.e., cutting line) is determined by the shape of the glass panel unit 10. Since the glass panel unit 10 has a rectangular shape, the cutting line has a linear shape aligned with the length of the boundary wall 42.

The glass panel unit 10 shown in FIG. 2 is obtained through the preparatory steps and removing step described above.

FIG. 2 illustrates a glass panel unit (i.e., a glass panel unit as a final product) 10 according to this embodiment. The glass panel unit 10 includes the first glass pane 20, the second glass pane 30, and the frame member 40. In addition, the glass panel unit 10 further has the evacuated space 50 surrounded with the first and second glass panes 20, 30 and the frame member 40. The glass panel unit 10 further includes, within the evacuated space 50, the gas adsorbent 60 and the plurality of pillars (spacers) 70. In the glass panel unit 10, neither the first glass pane 20 nor the second glass pane 30 has the exhaust port 700.

The first and second glass panes 20, 30 may each have a rectangular flat plate shape. The first and second glass panes 20, 30 have the same planar shape.

The first glass pane 20 according to this embodiment is obtained by removing the unnecessary part 230 from the first glass pane 200 through the removing step. Thus, the first glass pane 20 has the same configuration as the first glass pane 200. That is to say, the first glass pane 20 includes a body that forms the main shape of the first glass pane 20 and the low-emissivity film 220. The body is covered with the low-emissivity film 220 in the evacuated space 50. The first glass pane 20 has a rectangular flat plate shape.

The second glass pane 30 according to this embodiment is obtained by removing the unnecessary part 320 from the second glass pane 300 through the removing step. Thus, the second glass pane 30 has the same configuration as the second glass pane 300. That is to say, the second glass pane 30 includes a body that forms the main shape of the second glass pane 30. In this embodiment, the second glass pane 30 consists of the body alone. Optionally, the second glass pane 30 may include not only the body but also a low-emissivity film corresponding to the low-emissivity film 220. If the second glass pane 30 includes a low-emissivity film, then the low-emissivity film covers, and is in contact with, the body of the second glass pane 30 in the evacuated space 50.

The frame member 40 is provided between the first glass pane 20 and the second glass pane 30 to hermetically bond the first glass pane 20 and the second glass pane 30 together. Thus, the evacuated space 50 is surrounded with the first glass pane 20, the second glass pane 30, and the frame member 40. The frame member 40 has a polygonal (e.g., quadrangular in this embodiment) frame shape corresponding to that of the first and second glass panes 20, 30. The frame member 40 is formed along the respective outer peripheries of the first and second glass panes 20, 30.

The plurality of spacers 70 are placed in the evacuated space 50. The plurality of spacers 70 is used to maintain a desired gap distance between the first and second glass panes 20, 30.

<How Gas Adsorbent Adsorbs Gases>

The gas adsorbent 60 is placed in the evacuated space 50 of the glass panel unit 10. The getter material included in the gas adsorbent 60 contains a plurality of particles, of which the activatable temperature is equal to or lower than 400° C. As used herein, the "activatable temperature" refers to a temperature required for the plurality of particles included in the gas adsorbent 60 to be activated. That is to say, the plurality of particles included in the gas adsorbent 60 are activated at temperatures equal to or higher than the activatable temperature. The activated particles in the gas adsorbent 60 have had their gas adsorption capability increased. In other words, when reaching the activatable temperature, the particles in the gas adsorbent 60 are activated by releasing an adsorbed gas therefrom and comes to have increased gas adsorption capability. If the gas adsorbent 60 has been heated at a predetermined heating temperature for a sufficiently long time in a vacuum equal to or lower than 0.001 Pa and then the quantity of a nitrogen gas adsorbed is measured at a nitrogen equilibrium pressure of 0.1 Pa under an environment at 20° C., then the activatable temperature is a minimum required heating temperature at which the quantity of the nitrogen gas adsorbed becomes equal to or greater than $4\times10^{-11}$ mol/g. This quantity of the nitrogen gas adsorbed is used as follows to see if the activation temperature is equal to or higher than the activatable temperature. Specifically, 0.5 g of adsorbent is heated, as pretreatment, at a predetermined temperature (i.e., an activation temperature) for 12 hours or more while exhausting a gas from the furnace using a turbo pump such as BELSORP-MAX manufactured by MicrotracBEL Corporation, for example. Thereafter, the temperature is lowered to 20° C., and the quantity of the nitrogen gas adsorbed is measured at an equilibrium pressure of 0.1 Pa using, as an adsorbate, a nitrogen gas having a purity equal to or greater than 6N. If the quantity of the gas adsorbed is equal to or greater than $4\times10^{-11}$ mol/g, it may be confirmed that the predetermined temperature (activation temperature) is equal to or higher than the activatable temperature.

Next, particles contained in the gas adsorbent 60 and made of a zeolite crystal will be described.

In the getter material contained in the gas adsorbent 60, zeolite particles, accounting for a half or more of the total weight of a great many (or multiple) zeolite particles, each have a particle size equal to or greater than 200 nm. In other words, the sum of the respective weights of those zeolite particles, each having a particle size equal to or greater than 200 nm, accounts for a half or more of the total weight of the plurality of zeolite particles that form the getter material. Optionally, the sum of the respective weights of those zeolite particles, each having a particle size equal to or greater than 200 nm, may be the total weight of the plurality of zeolite particles contained in the getter material and the gas adsorbent 60. In that case, every one of the plurality of zeolite particles contained in the getter material and the gas adsorbent 60 has a particle size equal to or greater than 200 nm.

As described above, in general (e.g., under a pressure equal to or higher than 100 Pa), the smaller the particle size of the zeolite particles is and the larger the number of the zeolite particles is, the larger the combined surface area of the zeolite particles is, and the higher the gas adsorption capability of the zeolite becomes. If a zeolite particle has a relatively small particle size, then the depth of an internal space that extends inward from the micropores on the surface (i.e., the length of the path extending from the surface) is relatively short. Thus, the gas (molecules) cannot reach the depth of the internal space of the particle but are retained (adsorbed) in the vicinity of the surface. The gas retained in the vicinity of the surface will desorb from the particle in a predetermined time (which varies from one particle to another). Nevertheless, there is another gas to be newly adsorbed. Thus, an equilibrium is established between the gas desorbing from the particle and the gas adsorbed onto the particle. From a viewpoint of this equilibrium, the lower the pressure is, the smaller the quantity of the gas newly adsorbed is, and the smaller the point of equilibrium between desorption and adsorption is. Thus, the gas adsorption capability per unit weight declines. Also, under a constant pressure, the smaller the particle size is and the larger the combined surface area is, the higher the gas adsorption capability per unit weight becomes.

In a low-pressure range (e.g., equal to or lower than 100 Pa, and particularly, equal to or lower than 30 Pa), however, the desorption of the gas from a large particle would decrease from a different point of view from the equilibrium. Specifically, in a relatively large particle, the surface area per unit weight is relatively small but the depth of an internal space that extends inward from the micropores on the surface is relatively long. Thus, there will be a larger number of gas molecules that can reach the depth of the internal space of the particle than in the case of a relatively small particle. The gas molecules that have once reached the depth of the internal space are difficult to desorb from the particle. That is why in the low-pressure range, the larger the particle size of a particle is, the higher the gas adsorption capability per unit weight would be.

Next, the particle size of zeolite particles will be described. If a zeolite particle has a spherical shape, then the particle size is the diameter of the sphere. On the other hand, if a zeolite particle has a non-spherical shape, then the zeolite particle often has an ellipsoidal or rectangular parallelepiped shape. In that case, it would be the shortest width of the zeolite particle that affects the gas adsorption capability most significantly. As used herein, the "shortest width" refers to, on a plane that includes the center of mass of the particle, the length of the shortest one of multiple line segments that pass through the center of mass on the plane. For example, if a zeolite particle has an ellipsoidal shape, then the shortest width is the length in the minor axis direction of the zeolite particle. On the other hand, if a zeolite particle has a rectangular parallelepiped shape, for example, the shortest width is the length of the shortest side out of the multiple sides of the rectangular parallelepiped. If the shape of a zeolite particle is neither a rectangular parallelepiped shape nor an ellipsoidal shape, then the shortest width refers to, on an arbitrary plane including a line with the longest width of the particle, the smallest particle width in a set of lines with the longest width and maximum vertical particle widths. Note that if a zeolite particle has a spherical shape, the shortest width is the diameter of the sphere.

In this case, the shortest width of a particle is adopted as an index for the following reason. Specifically, a portion corresponding to the shortest width tends to have a broad surface area. In addition, the shorter the depth of the internal space of the portion corresponding to the shortest width is, the more likely the gas that has reached the internal space desorbs. That is why the shortest width of the zeolite particle would most significantly affect the gas adsorption capability per unit weight of the zeolite particle.

The particle size may be determined by measuring the minor-axis width of the particle through so-called "scanning electron microscope (SEM)" observation. If the particle has a flat plate shape, then the thickness of the plate particle may be measured as its minor-axis width. Also, the weight ratio of respective particles may be determined by calculating their volume ratio based on the respective shapes of the particles observed through an SEM. Note that if non-zeolite particles are included, then the volume ratio is calculated with those non-zeolite particles excluded.

Figure 9:
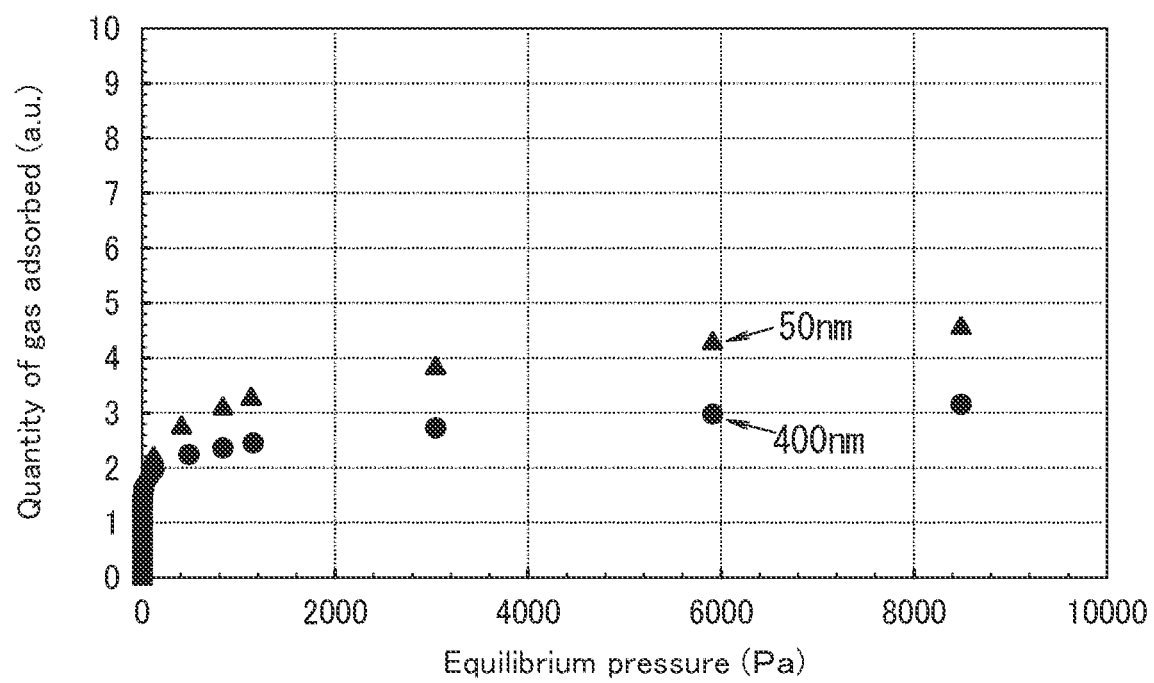
FIG. 9 is a graph showing a relationship between the equilibrium pressure and the quantity of gas adsorbed.
Figure 10:
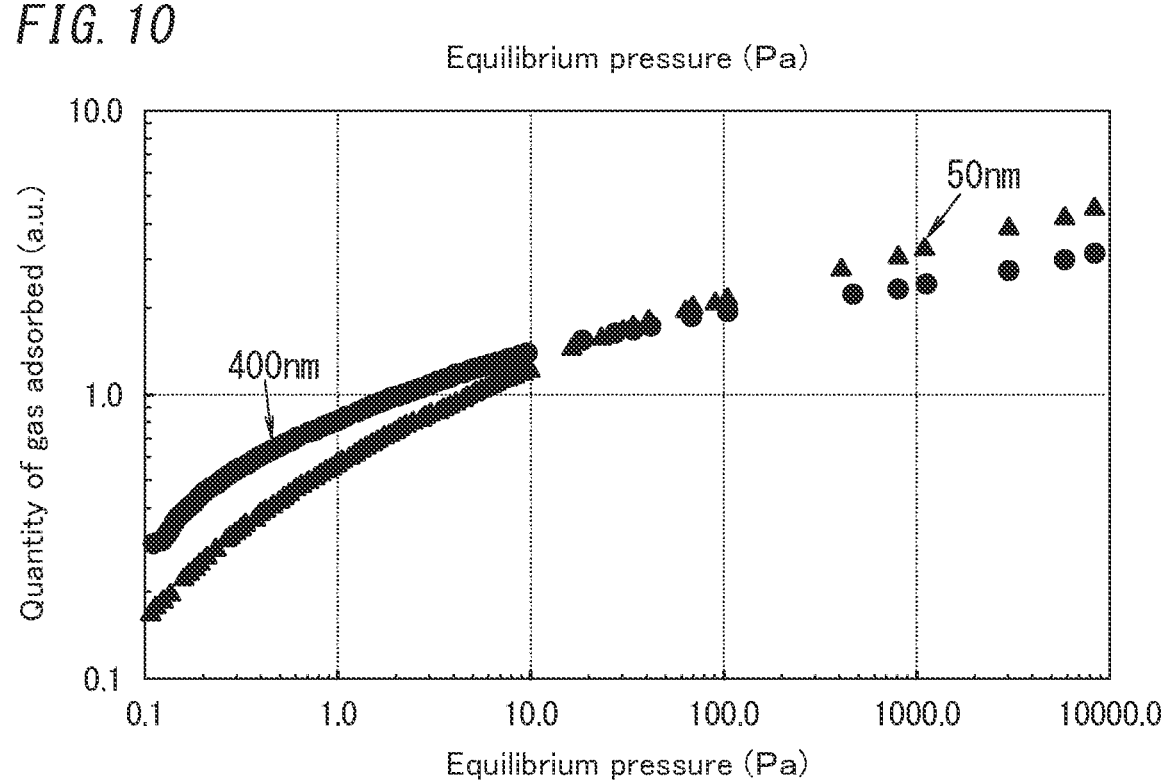
FIG. 10 is a graph showing, on a logarithmic axis, the relationship between the equilibrium pressure and the quantity of gas adsorbed.

FIGS. 9 and 10 show the results of experiments that were conducted to compare the respective gas adsorption capabilities of a copper ion-exchanged ZSM-5 particle with a particle size of 50 nm and a copper ion-exchanged ZSM-5 particle with a particle size of 400 nm. In FIGS. 9 and 10 showing a relationship between the equilibrium pressure and the quantity of the gas adsorbed, the abscissa indicates the equilibrium pressure (Pa) and the ordinate indicates the quantity of the nitrogen gas adsorbed (in an arbitrary unit) at 20° C. Note that in FIG. 9, the axes of ordinates and abscissas are normal axes but in FIG. 10, the axes of ordinates and abscissas are logarithmic axes. As can be seen from FIG. 10, around a point where the equilibrium pressure is approximately 30 Pa, tables are turned in the respective levels of the gas adsorption capability of the copper ion-exchanged ZSM-5 particle with the particle size of 50 nm and the copper ion-exchanged ZSM-5 particle with the particle size of 400 nm.

In this embodiment, it is preferable that those particles, accounting for a half or more of the total weight of the plurality of (i.e., multiple) particles contained in the gas adsorbent 60, each have a particle size equal to or greater than 200 nm. Those particles, accounting for a half or more of the total weight of the plurality of particles contained in the gas adsorbent 60, more preferably each have a particle size equal to or greater than 300 nm. Those particles, accounting for a half or more of the total weight of the plurality of particles contained in the gas adsorbent 60, even more preferably each have a particle size equal to or greater than 400 nm. In other words, it is preferable that the sum of the respective weights of those particles, each having a particle size equal to or greater than 400 nm, be half or more of the total weight of the plurality of particles contained in the gas adsorbent 60.

Figure 11:
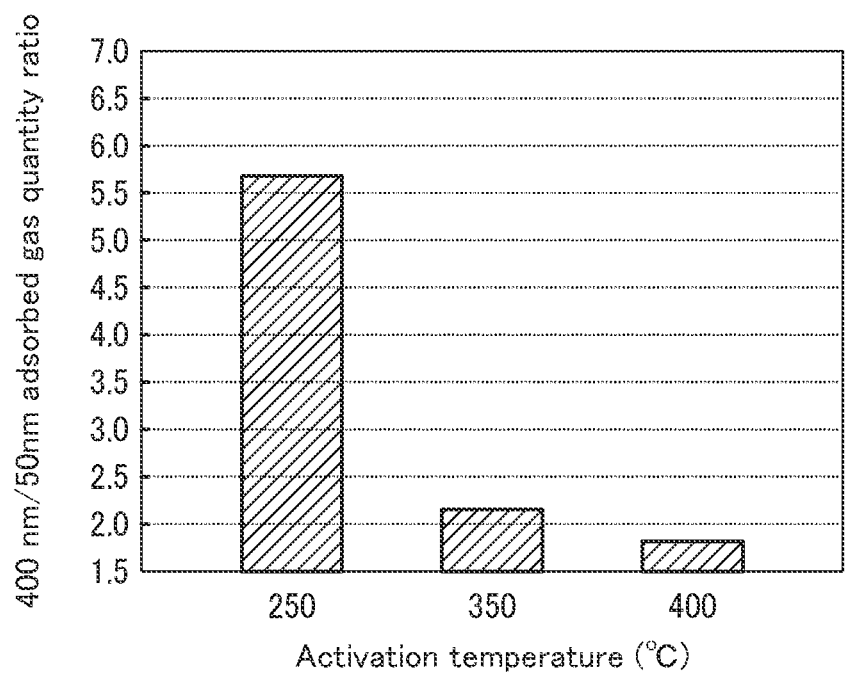
FIG. 11 is a graph showing a relationship between the ratio of the quantities of gases adsorbed and the activation temperature.

FIG. 11 shows the results of experiments that were conducted to compare the respective activation temperatures of the gas adsorption capability of a particle with a particle size of 50 nm and a particle with a particle size of 400 nm. In FIG. 11 showing a relationship between the ratio of the quantities of the gas adsorbed and the activation temperature, the abscissa indicates the activation temperature (° C.) and the ordinate indicates the ratio of the quantity of nitrogen gas adsorbed into a particle having a particle size of 400 nm to the quantity of nitrogen gas adsorbed into a particle having a particle size of 50 nm in an environment at 20° C. with an equilibrium pressure of 0.1 Pa. It can be seen from FIG. 11 that the ratio of the quantities of the gas adsorbed is larger in a situation where the activation temperature is 350° C. than in a situation where the activation temperature is 400° C. and that the ratio of the quantities of the gas adsorbed is much larger in a situation where the activation temperature is 250° C. than in a situation where the activation temperature is 350° C. This is probably because in the case of a copper ion-exchanged zeolite, setting the activation temperature (i.e., the temperature in the gas exhausting step) at a temperature equal to or lower than 350° C. significantly reduces the chances of powerful nitrogen adsorption sites being expressed by copper oxide reduction and instead increases the proportion of the crystal size effect.

Thus, the advantage of this embodiment is achieved more significantly when the exhaust temperature (equivalent to the activation temperature) in the manufacturing process of the glass panel unit 10 is equal to or lower than 400° C., achieved even more significantly when the exhaust temperature is equal to or lower than 350° C., and achieved particularly significantly when the exhaust temperature is equal to or lower than 300° C. Also, since the gas exhausting step is performed at a temperature either around, or lower than, the melting temperature of the sealant (namely, the first sealant and the second sealant), the glass panel unit 10 according to the present invention achieves a significant advantage when the melting temperature of the sealant (which is at least one of the first sealant or the second sealant) is equal to or lower than 400° C., achieves a more significant advantage when the melting temperature of the sealant is equal to or lower than 350° C., and achieves a particularly significant advantage when the melting temperature of the sealant is equal to or lower than 300° C.

Figure 12:
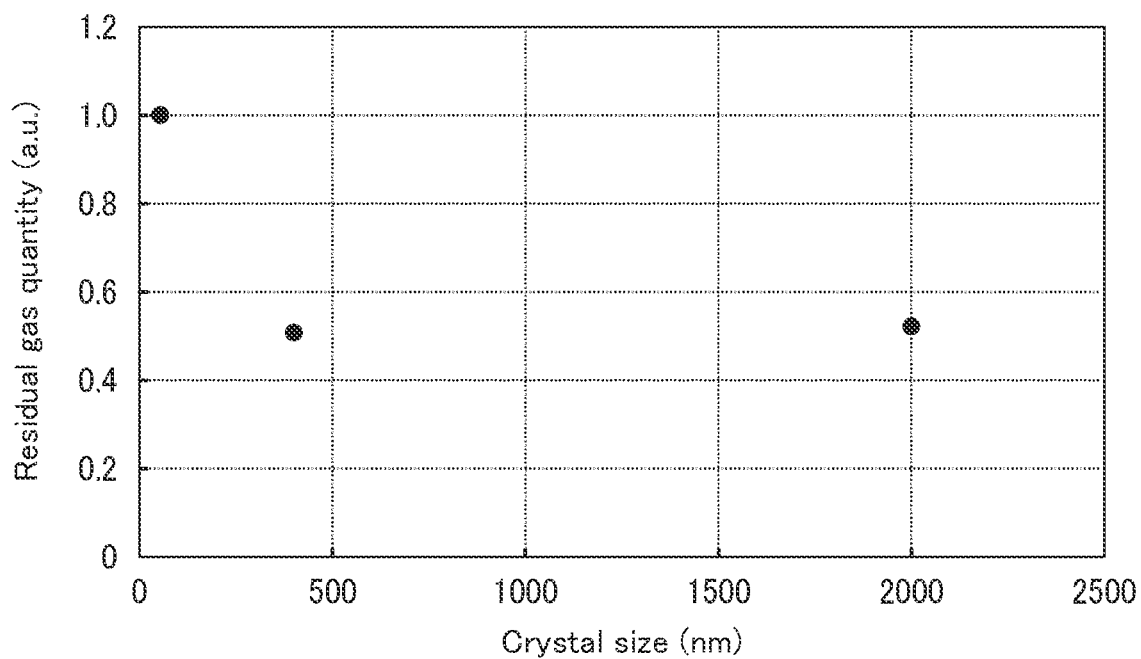
FIG. 12 is a graph showing a relationship between the quantity of residual gases and the size of the crystal (particle)

FIG. 12 shows a relationship between the quantity of the residual gases and the size of the crystal (crystal size). In this case, the gas adsorbent 60 was activated under the same condition as in the gas exhausting step (at an exhaust temperature Te=250° C.) between the first melting step and the second melting step shown in FIG. 6. In the graph shown in FIG. 12, the abscissa indicates the crystal size that is the size (nm) of the crystal, and the ordinate indicates the quantity of the residual gases (in an arbitrary unit). It can be seen from FIG. 12 that the quantity of the residual gases is smaller when the crystal size is 400 nm and when the crystal size is 200 nm than when the crystal size is 50 nm.

Thus, in the glass panel unit 10, the getter material preferably includes a copper ion-exchanged zeolite with a crystal size equal to or greater than 400 nm and either the softening point or the melting point of the sealant (which is at least one of the first sealant or the second sealant) is preferably equal to or lower than 350° C.

This glass panel unit 10 makes it easier to lower the nitrogen partial pressure in the evacuated space 50 to 0.1 Pa or less. This means that even if nitrogen gas, which is difficult to be adsorbed into an ordinary adsorbent, remains in, or is released into, the evacuated space of the glass panel unit 10, a sufficiently high degree of vacuum may still be created, and good thermal insulation properties are achievable easily.

In addition, this embodiment makes it easier to make the total quantity of the nitrogen gas adsorbed equal to or greater than 0.1 V (Pa·m$^3$), where V (m$^3$) is the volume of the evacuated space 50. This means that even though the pressure in the evacuated space 50 should be raised to 0.1 Pa or more by the nitrogen gas remaining in, or released into, the evacuated space 50, the partial pressure of the nitrogen gas may be lowered to 0.1 Pa or less according to this embodiment by having the nitrogen gas adsorbed into the gas adsorbent 60.

Also, the particle size of the particles, accounting for a half or more of the total weight of the plurality of particles, is preferably equal to or less than 30 μm, and more preferably equal to or less than 10 μm.

Figure 13A:
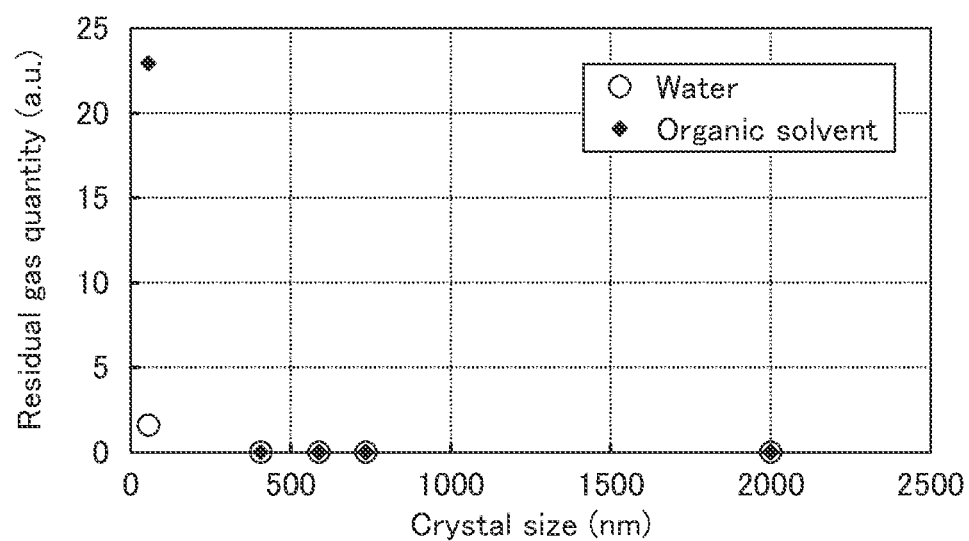
FIG. 13A is a graph showing a relationship between respective quantities of residual gases in water and an organic solvent and the size of the crystal (particle)

FIG. 13A shows a relationship between the quantity of the residual gas in the glass panel unit 10 and the size of the crystal (crystal size). It can be seen from FIG. 13A that the quantity of the residual gas in the glass panel unit 10 varies depending on whether the solvent of the getter material composition is water or an organic solvent. That is to say, depending on whether the solvent of the getter material composition is water or an organic solvent, not only the volume of the solvent remaining in each particle of a zeolite crystal but also the gas adsorption capability of the gas adsorbent 60 vary as well.

As is clear from FIG. 13A, if the crystal size of the zeolite is very small, the gas adsorbent using an organic solvent as the solvent of the getter material composition has a larger quantity of residual gas (i.e., the gas adsorbent has a relatively low performance). However, when the crystal size of the zeolite is 400 nm, the gas adsorbent using an organic solvent as the solvent of the getter material composition and the gas adsorbent using water as the solvent of the getter material composition have almost the same residual gas quantity (i.e., the residual gas quantity ratio becomes approximately equal to one). When the crystal size of the zeolite is greater than 400 nm, the property of the gas adsorbent (i.e., the gas adsorption capability) is better when an organic solvent is used as the solvent of the getter material composition than when water is used as the solvent of the getter material composition. For example, when the crystal size of the zeolite is equal to or greater than 600 nm, the residual gas quantity ratio is equal to or less than one.

Figure 13B:
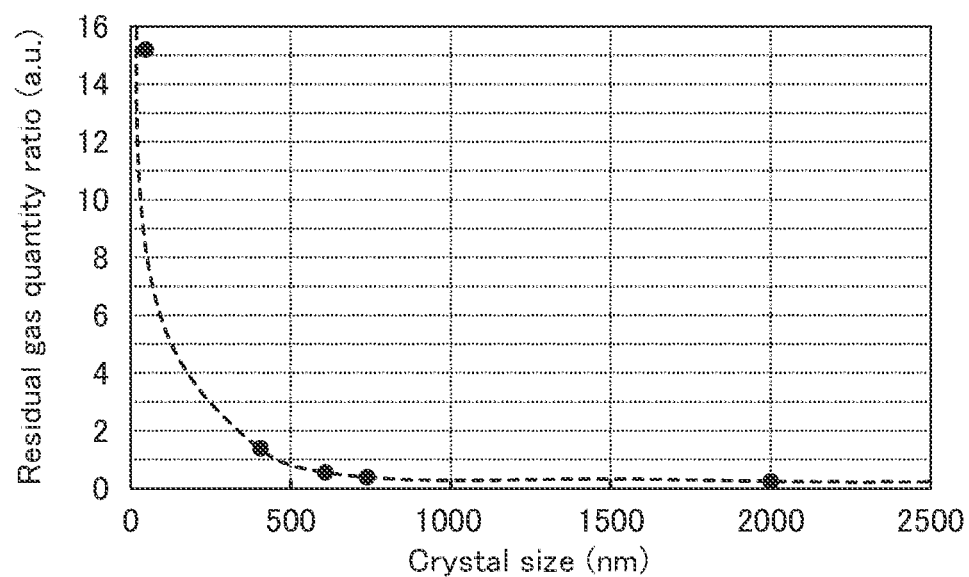
FIG. 13B is a graph showing a relationship between the ratio of respective quantities of residual gases and the size of the crystal (particle).

As shown in FIG. 13B, when the particle size of the particle of a zeolite crystal is equal to or greater than 500 nm, the residual gas quantity ratio is equal to or less than one, and therefore, it is more advantageous to use an organic solvent, rather than water, as the solvent of the getter material composition. That is to say, the gas adsorbent comes to have a higher gas adsorption capability by using an organic solvent as the solvent of the getter material composition rather than using water as its solvent. Note that the residual gas quantity ratio is given by the following equation (2):

residual gas quantity ratio=[residual gas quantity when organic solvent is used]=[residual gas quantity when water is used]     (2)

Thus, when an organic solvent is used as the solvent of the getter material composition, the particle size (i.e., crystal size) of each particle of a zeolite crystal is preferably at least 200 nm, more preferably equal to or greater than 300 nm, even more preferably equal to or greater than 400 nm, yet more preferably equal to or greater than 500 nm, and particularly preferably equal to or greater than 600 nm. It is even better that the particle size of the particle of a zeolite crystal is equal to or greater than 750 nm, equal to or greater than 1000 nm, equal to or greater than 1500 nm, or equal to or greater than 2000 nm. That is to say, the getter material composition preferably contains a copper ion-exchanged zeolite having a crystal size equal to or greater than 400 nm (or equal to or greater than 600 nm) and preferably includes an organic solvent having a cyclic structure.

For example, in the getter material composition, those particles, accounting for a half or more of the total weight of the plurality of particles of a zeolite crystal, preferably has a particle size equal to or greater than 200 nm, and those particles preferably have a mean particle size equal to or greater than 200 nm. This enables providing a gas adsorbent 60 that is likely to exhibit sufficient adsorption performance in a low-pressure range. The mean particle size (average size) of the plurality of particles of a zeolite crystal may be determined by measuring the respective minor-axis widths of the plurality of particles through an SEM observation and calculating their average as described above.

The present inventors carried out an experiment in the same way with 0.5 parts by mass of zeolite particles each having a crystal size less than 200 nm (e.g., having a crystal size of 50 nm) and 0.5 parts by mass of zeolite particles each having a crystal size equal to or greater than 200 nm (e.g., having a crystal size of 400 nm) mixed with an organic solvent. As a result, the residual gas quantity was close to (i.e., from as large as to 1.5 times as large as) the residual gas quantity in a situation where zeolite particles, every one of which had a crystal size of 400 nm, was mixed with an organic solvent. However, when 0.75 parts by mass of zeolite particles each having a crystal size less than 200 nm (e.g., having a crystal size of 50 nm) and 0.25 parts by mass of zeolite particles each having a crystal size equal to or greater than 200 nm (e.g., having a crystal size of 400 nm) was mixed with an organic solvent, the residual gas quantity was almost the same as (i.e., from 0.8 times as large as to as large as) the residual gas quantity in a situation where zeolite particles, every one of which had a crystal size of 50 nm, was mixed with an organic solvent. This is probably because in a low-pressure state that should be established when zeolite particles, each having a large crystal size, are used, zeolite particles having a relatively small crystal size are releasing a gas. As the proportion of such zeolite particles having a relatively small crystal size increases, the release of the gas outweighs the adsorption of the gas in the low-pressure range in the getter material as a whole, thus reducing the advantage to be achieved by particles having a relatively large crystal size. That is why those zeolite particles, each having a crystal size less than 200 nm, preferably account for less than a half of the total weight of the plurality of particles of a zeolite crystal.

Furthermore, the sum of the respective weights of zeolite particles, each having a crystal size less than 300 nm, more preferably accounts for less than a half of the total weight of the plurality of particles of a zeolite crystal. The sum of the respective weights of zeolite particles, each having a crystal size less than 400 nm, more preferably accounts for less than a half of the total weight of the plurality of particles of the zeolite crystal. The sum of the respective weights of zeolite particles, each having a crystal size less than 500 nm, more preferably accounts for less than a half of the total weight of the plurality of particles of the zeolite crystal. The sum of the respective weights of zeolite particles, each having a crystal size less than 600 nm, more preferably accounts for less than a half of the total weight of the plurality of particles of the zeolite crystal. The sum of the respective weights of zeolite particles, each having a crystal size less than 750 nm, more preferably accounts for less than a half of the total weight of the plurality of particles of the zeolite crystal. The sum of the respective weights of zeolite particles, each having a crystal size less than 1000 nm, more preferably accounts for less than a half of the total weight of the plurality of particles of the zeolite crystal. The sum of the respective weights of zeolite particles, each having a crystal size less than 1500 nm, more preferably accounts for less than a half of the total weight of the plurality of particles of the zeolite crystal. The sum of the respective weights of zeolite particles, each having a crystal size less than 2000 nm, more preferably accounts for less than a half of the total weight of the plurality of particles of the zeolite crystal. Also, the sum of the respective weights of zeolite particles, each having a crystal size less than 200 nm, may account for less than a half of the total weight of the plurality of particles of the zeolite crystal and the sum of the respective weights of zeolite particles, each having a crystal size equal to or greater than 400 nm, may account for more than 25% of the total weight of the plurality of particles of the zeolite crystal. This may reduce the effect of particles having small crystal sizes.

Note that the size-by-size proportions of zeolite particles (crystal) are indicated in the previous paragraph on a weight basis. Almost the same trend is observed even if the comparisons are made on the basis of the number or the volume of the particles. That is to say, the number of particles, each having a crystal size less than 200 nm, preferably accounts for less than a half of the total number of the plurality of particles of the zeolite crystal. Alternatively, the sum of the respective volumes of particles, each having a crystal size less than 200 nm, preferably accounts for less than a half of the total volume of the plurality of particles of the zeolite crystal.

Furthermore, the sum of the respective volumes of zeolite particles, each having a crystal size less than 300 nm, more preferably accounts for less than a half of the total volume of the plurality of particles of the zeolite crystal. The sum of the respective volumes of zeolite particles, each having a crystal size less than 400 nm, more preferably accounts for less than a half of the total volume of the plurality of particles of the zeolite crystal. The sum of the respective volumes of zeolite particles, each having a crystal size less than 500 nm, more preferably accounts for less than a half of the total volume of the plurality of particles of the zeolite crystal. The sum of the respective volumes of zeolite particles, each having a crystal size less than 600 nm, more preferably accounts for less than a half of the total volume of the plurality of particles of the zeolite crystal. The sum of the respective volumes of zeolite particles, each having a crystal size less than 750 nm, more preferably accounts for less than a half of the total volume of the plurality of particles of the zeolite crystal. The sum of the respective volumes of zeolite particles, each having a crystal size less than 1000 nm, more preferably accounts for less than a half of the total volume of the plurality of particles of the zeolite crystal. The sum of the respective volumes of zeolite particles, each having a crystal size less than 1500 nm, more preferably accounts for less than a half of the total volume of the plurality of particles of the zeolite crystal. The sum of the respective volumes of zeolite particles, each having a crystal size less than 2000 nm, more preferably accounts for less than a half of the total volume of the plurality of particles of the zeolite crystal.

Furthermore, the number of zeolite particles, each having a crystal size less than 300 nm, more preferably accounts for less than a half of the total number of the plurality of particles of the zeolite crystal. The number of zeolite particles, each having a crystal size less than 400 nm, more preferably accounts for less than a half of the total number of the plurality of particles of the zeolite crystal. The number of zeolite particles, each having a crystal size less than 500 nm, more preferably accounts for less than a half of the total number of the plurality of particles of the zeolite crystal. The number of zeolite particles, each having a crystal size less than 600 nm, more preferably accounts for less than a half of the total number of the plurality of particles of the zeolite crystal. The number of zeolite particles, each having a crystal size less than 750 nm, more preferably accounts for less than a half of the total number of the plurality of particles of the zeolite crystal. The number of zeolite particles, each having a crystal size less than 1000 nm, more preferably accounts for less than a half of the total number of the plurality of particles of the zeolite crystal. The number of zeolite particles, each having a crystal size less than 1500 nm, more preferably accounts for less than a half of the total number of the plurality of particles of the zeolite crystal. The number of zeolite particles, each having a crystal size less than 2000 nm, more preferably accounts for less than a half of the total number of the plurality of particles of the zeolite crystal.

Also, the sum of the respective volumes of zeolite particles, each having a crystal size less than 200 nm, may account for less than a half of the total volume of the plurality of particles of the zeolite crystal and the sum of the respective volumes of zeolite particles, each having a crystal size equal to or greater than 400 nm, may account for more than 25% of the total volume of the plurality of particles of the zeolite crystal. This may reduce the effect of particles having small crystal sizes. Furthermore, the number of zeolite particles, each having a crystal size less than 200 nm, may account for less than a half of the total number of the plurality of particles of the zeolite crystal, and the number of zeolite particles, each having a crystal size equal to or greater than 400 nm, may account for more than 25% of the total number of the plurality of particles of the zeolite crystal.

The glass panel unit 10 used in FIGS. 13A and 13B had the following specifics:

Getter material as a constituent material for gas adsorbent: Cu-ZSM-5 (copper ion-exchanged zeolite);
Weight of gas adsorbent: 100 mg;
Solvent of getter material composition: α-pinene or water (note that the getter material composition was applied after the getter material and the solvent were mixed with each other and the mixture thus obtained was left for one week);

Volume of evacuated space: 9000 mm$^3$;

First melting temperature: 290° C.;

Gas exhaustion temperature and time: 250° C. and 30 min.;

Second melting temperature: 300° C.; and

Sealant: vanadium-based frit (having a softening point of 270° C.; the same material was used as the first sealant and the second sealant).

(Variations)

Note that the embodiment described above is only an exemplary one of various embodiments of the present disclosure and should not be construed as limiting. Rather, the exemplary embodiment described above may be readily modified in various manners depending on a design choice or any other factor without departing from the scope of the present disclosure. Next, variations of the exemplary embodiment will be enumerated one after another. In the following description, the exemplary embodiment described above will be hereinafter referred to as a "basic example."

In the basic example described above, only the first glass pane 200, out of the first and second glass panes 200, 300, includes the low-emissivity film 220. In one variation, the second glass pane 300 may also include a low-emissivity film. That is to say, each of the first and second glass panes 200, 300 may include the low-emissivity film. Thus, each of the first and second glass panes 20, 30 may also include the low-emissivity film. Alternatively, neither the first glass pane 20 nor the second glass pane 30 may include any low-emissivity film.

In the basic example described above, out of the first and second glass panes 200, 300, the first glass pane 200 includes the low-emissivity film 220 but the second glass pane 300 includes no low-emissivity films. In another variation, however, the second glass pane 300 may include a low-emissivity film and the first glass pane 200 may include no low-emissivity film 220. Thus, in a glass panel unit 10 according to this variation, the second glass pane 30 may include a low-emissivity film and the first glass pane 20 may include no low-emissivity film 220.

In the basic example described above, the gas exhausting step is started after the first melting step has ended. In a variation, if the temperature in the melting furnace is lower than the first softening point after the first melting time tm1 has passed, then the gas exhausting step may be started halfway through the first melting step.

In the basic example described above, the gas exhausting step ends when the second melting step ends. In a variation, the gas exhausting step may be started after the first melting step has ended and may end before the second melting step ends.

In the basic example described above, the glass panel unit 10 has a rectangular shape. Alternatively, in a variation, the glass panel unit 10 may also have a circular, polygonal, or any other desired shape. That is to say, the first glass pane 20 and the second glass pane 30 do not have to be rectangular but may also have a circular, polygonal, or any other desired shape.

The first and second glass panes 20, 30 do not have to have the same planar shape and the same planar dimensions. Also, the first glass pane 20 does not have to be as thick as the second glass pane 30, either. The same statement applies to the first and second glass panes 200, 300 as well.

The peripheral wall 410 does not have to have the same planar shape as the first and second glass panes 200, 300, either.

Optionally, the peripheral wall 410 may include other elements such as a core material.

Also, in the assembly 100, the peripheral wall 410 is just provided between the first and second glass panes 200, 300 and does not bond the first and second glass panes 200, 300 together. Alternatively, however, in the assembly 100 stage, the peripheral wall 410 may bond the first and second glass panes 200, 300 together. In short, in the assembly 100, the peripheral wall 410 only needs to be provided between the first and second glass panes 200, 300 and does not have to bond the first and second glass panes 200, 300 together.

Furthermore, in the basic example described above, the partition 420 is out of contact with the peripheral wall 410. This allows air passages 610, 620 to be formed in the respective gaps between both ends of the partition 420 and the peripheral wall 410. However, this is only an example and should not be construed as limiting. Alternatively, only one of the two ends of the partition 420 may be coupled to the peripheral wall 410. In that case, only one air passage 600 may be formed between the partition 420 and the peripheral wall 410. Still alternatively, the partition 420 may even have both ends thereof coupled to the peripheral wall 410. In that case, the air passage 600 may be a through hole provided through the partition 420. Alternatively, the air passage 600 may also be a gap between the partition 420 and the first glass pane 200. Still alternatively, the partition 420 may be made up of two or more partitions arranged at intervals. In that case, the air passage 600 may be a gap left between the two or more partitions.

In the basic example described above, the air passages 600 include the two air passages 610, 620. Alternatively, only one air passage 600 may be provided or the air passages 600 may include three or more air passages. Furthermore, the air passages 600 may have any shape without limitation.

Furthermore, in the basic example described above, the internal space 500 is partitioned into the one first space 510 and the one second space 520. However, this is only an example and should not be construed as limiting. Alternatively, the internal space 500 may also be partitioned by the partition 420 into one or more first spaces 510 and one or more second spaces 520. If the internal space 500 has two or more first spaces 510, two or more glass panel units 10 may be obtained from a single work in progress 110.

In the basic example described above, the first space 510 is the evacuated space 50. However, the evacuated space 50 may be replaced with a vacuum space. The vacuum space is the first space 510 in a pressure-reduced condition. As used herein, the "pressure-reduced condition" refers to a condition in which the pressure is lower than the atmospheric pressure.

In the basic example described above, the evacuated space 50 is spatially separated from the external environment by the boundary wall 42. In one variation, however, only the inside or outer peripheral portion of the exhaust port 700 may be sealed up with the sealant. Also, sealing may also be done by locally heating only a peripheral portion of the exhaust port 700 and thereby melting the sealant, instead of closing the air passages 600 in the second melting step. Still alternatively, sealing may also be done by evacuating the entire furnace and thereby reducing the pressure inside the glass panel unit 10 and then heating the glass panel unit 10 in a vacuum and thereby melting the outer peripheral sealant, without forming any exhaust port 700.

In the basic example described above, the evacuated space 50 is spatially separated from the external environment by the boundary wall 42. In one variation, however, the evacuated space 50 may also be spatially separated from the external environment by a sealing portion formed by melting and cutting off an intermediate portion of the exhaust pipe connected to the exhaust port 700. That is to say, the boundary wall 42 does not have to be used as a member for spatially separating the evacuated space 50 from the external environment.

(Recapitulation)

As can be seen from the foregoing description of the exemplary embodiment and its variations, a glass panel unit (10) according to a first aspect includes: a first glass pane (20); a second glass pane (30) facing the first glass pane (20); a frame member (40); an evacuated space (50); and a gas adsorbent (60). The frame member (40) hermetically bonds the first glass pane (20) and the second glass pane (30). The evacuated space (50) is surrounded with the first glass pane (20), the second glass pane (30), and the frame member (40). The gas adsorbent (60) is placed in the evacuated space (50). The gas adsorbent (60) contains a getter material. The getter material contains a plurality of particles of a zeolite crystal. At least one particle accounting for a half or more of a total weight of the plurality of particles has a particle size equal to or greater than 200 nm. An activable temperature of the at least one particle is equal to or lower than 400° C.

The glass panel unit (10) according to the first aspect is likely to achieve a sufficient adsorption performance in a low-pressure range.

A glass panel unit (10) according to a second aspect may be implemented in conjunction with the first aspect. In the glass panel unit (10) according to the second aspect, a weight of the rest of the plurality of particles, having a particle size less than 200 nm, accounts for less than a half of the total weight of the plurality of particles.

The glass panel unit (10) according to the second aspect is likely to achieve a sufficient adsorption performance in a low-pressure range.

A glass panel unit (10) according to a third aspect may be implemented in conjunction with the first or second aspect. In the glass panel unit (10) according to the third aspect, the at least one particle accounting for a half or more of the total weight of the plurality of particles has a particle size equal to or greater than 400 nm.

The third aspect makes it easier to achieve a sufficient adsorption performance in a low-pressure range.

A glass panel unit (10) according to a fourth aspect may be implemented in conjunction with any one of the first to third aspects. In the glass panel unit (10) according to the fourth aspect, a nitrogen gas in the evacuated space (50) has a partial pressure equal to or lower than 0.1 Pa.

The fourth aspect makes it easier to provide a glass panel unit (10) with excellent thermal insulation properties.

A glass panel unit (10) according to a fifth aspect may be implemented in conjunction with any one of the first to fourth aspects. In the glass panel unit (10) according to the fifth aspect, a total quantity of a nitrogen gas adsorbed at 20° C. by the at least one particle is equal to or greater than 0.1 V (Pa·m$^3$), where V (m$^3$) is a volume of the evacuated space (50).

The fifth aspect makes it easier to provide a glass panel unit (10) with excellent thermal insulation properties.

A glass panel unit (10) according to a sixth aspect may be implemented in conjunction with any one of the first to fifth aspects. In the glass panel unit (10) according to the sixth aspect, the zeolite is a copper ion-exchanged zeolite.

The sixth aspect makes it easier for the gas adsorbent (60) to achieve a sufficient adsorption performance.

A glass panel unit (10) according to a seventh aspect may be implemented in conjunction with any one of the first to sixth aspects. In the glass panel unit (10) according to the seventh aspect, the at least one particle is a primary particle, and the particle size is the shortest width of the at least one particle.

The glass panel unit (10) according to the seventh aspect is likely to achieve a sufficient adsorption performance in a low-pressure range.

A glass panel unit (10) according to an eighth aspect includes: a first glass pane (20); a second glass pane (30) facing the first glass pane (20); a frame member (40); an evacuated space (50); and a gas adsorbent (60). The frame member (40) hermetically bonds the first glass pane (20) and the second glass pane (30). The evacuated space (50) is surrounded with the first glass pane (20), the second glass pane (30), and the frame member (40). The gas adsorbent (60) is placed in the evacuated space (50). The gas adsorbent (60) contains a getter material. The getter material contains a plurality of particles of a zeolite crystal. At least one particle accounting for a half or more of a total number of the plurality of particles has a particle size equal to or greater than 200 nm. An activable temperature of the at least one particle is equal to or lower than 400° C.

The glass panel unit (10) according to the eighth aspect is likely to achieve a sufficient adsorption performance in a low-pressure range.

A glass panel unit (10) according to a ninth aspect includes: a first glass pane (20); a second glass pane (30) facing the first glass pane (20); a frame member (40); an evacuated space (50); and a gas adsorbent (60). The frame member (40) hermetically bonds the first glass pane (20) and the second glass pane (30). The evacuated space (50) is surrounded with the first glass pane (20), the second glass pane (30), and the frame member (40). The gas adsorbent (60) is placed in the evacuated space (50). The gas adsorbent (60) contains a getter material. The getter material contains a plurality of particles of a zeolite crystal. At least one particle accounting for a half or more of a total volume of the plurality of particles has a particle size equal to or greater than 200 nm. An activable temperature of the at least one particle is equal to or lower than 400° C.

The glass panel unit (10) according to the ninth aspect is likely to achieve a sufficient adsorption performance in a low-pressure range.

A glass panel unit (10) according to a tenth aspect includes: a first glass pane (20); a second glass pane (30) facing the first glass pane (20); a frame member (40); an evacuated space (50); and a gas adsorbent (60). The frame member (40) hermetically bonds the first glass pane (20) and the second glass pane (30). The evacuated space (50) is surrounded with the first glass pane (20), the second glass pane (30), and the frame member (40). The gas adsorbent (60) is placed in the evacuated space (50). The gas adsorbent (60) contains a getter material. The getter material contains a plurality of particles of a zeolite crystal and a hydrogenation catalyst.

The glass panel unit (10) according to the tenth aspect is likely to achieve a sufficient adsorption performance in a low-pressure range.

A getter material according to an eleventh aspect contains a plurality of particles of a zeolite crystal. At least one particle accounting for a half or more of a total weight of the plurality of particles has a particle size equal to or greater than 200 nm. An activable temperature of the at least one particle is equal to or lower than 400° C.

The getter material according to the eleventh aspect is likely to achieve a sufficient adsorption performance in a low-pressure range.

A getter material according to a twelfth aspect may be implemented in conjunction with the eleventh aspect. In the getter material according to the twelfth aspect, the at least one particle accounting for a half or more of the total weight of the plurality of particles has a particle size equal to or greater than 400 nm.

The getter material according to the twelfth aspect may achieve a sufficient adsorption performance in a low-pressure range.

A getter material according to a thirteenth aspect may be implemented in conjunction with the eleventh or twelfth aspect. In the getter material according to the thirteenth aspect, the at least one particle accounting for a half or more of the total weight of the plurality of particles has a particle size equal to or greater than 600 nm.

The getter material according to the thirteenth aspect is likely to achieve a sufficient adsorption performance in a low-pressure range.

A getter material according to a fourteenth aspect may be implemented in conjunction with any one of the eleventh to thirteenth aspects. In the getter material according to the fourteenth aspect, each of the plurality of particles has a particle size equal to or greater than 1000 nm.

The getter material according to the fourteenth aspect is likely to achieve a sufficient adsorption performance in a low-pressure range.

A getter material according to a fifteenth aspect may be implemented in conjunction with any one of the eleventh to fourteenth aspects. In the getter material according to the fifteenth aspect, the at least one particle is a primary particle, and the particle size is the shortest width of the at least one particle.

The getter material according to the fifteenth aspect is likely to achieve a sufficient adsorption performance in a low-pressure range.

A getter material according to a sixteenth aspect may be implemented in conjunction with any one of the eleventh to fifteenth aspects. The getter material according to the sixteenth aspect further includes a carbon dioxide adsorbent (except cerium oxide).

The getter material according to the sixteenth aspect adsorbs carbon dioxide more easily and is likely to achieve a sufficient adsorption performance in a low-pressure range.

A getter material according to a seventeenth aspect may be implemented in conjunction with the sixteenth aspect. In the getter material according to the seventeenth aspect, the carbon dioxide adsorbent includes at least one selected from the group consisting of silica, alumina, and activated carbon.

The getter material according to the seventh aspect adsorbs carbon dioxide more easily and is likely to achieve a sufficient adsorption performance in a low-pressure range.

A getter material according to an eighteenth aspect may be implemented in conjunction with any one of the eleventh to seventeenth aspects. The getter material according to the eighteenth aspect further includes a hydrogenation catalyst.

The getter material according to the eighteenth aspect hydrogenates a given compound more easily and is likely to achieve a sufficient adsorption performance in a low-pressure range.

A getter material according to a nineteenth aspect may be implemented in conjunction with the eighteenth aspect. In the getter material according to the nineteenth aspect, the hydrogenation catalyst is powder.

The getter material according to the nineteenth aspect hydrogenates a given compound more easily and is likely to achieve a sufficient adsorption performance in a low-pressure range.

A getter material according to a twentieth aspect may be implemented in conjunction with the eighteenth or nineteenth aspect. In the getter material according to the twentieth aspect, the hydrogenation catalyst is supported by a catalytic support including at least one selected from the group consisting of silica, alumina, and activated carbon.

The getter material according to the twentieth aspect reduces the chances of the hydrogenation catalyst desorbing by having the hydrogenation catalytic supported by the catalytic support.

A getter material according to a twenty-first aspect may be implemented in conjunction with any one of the eleventh to twentieth aspects. In the getter material according to the twenty-first aspect, the zeolite is a copper ion-exchanged zeolite.

The getter material according to the twenty-first aspect is likely to achieve a sufficient adsorption performance.

A getter material composition according to a twenty-second aspect contains a getter material and a solvent. The getter material contains a plurality of particles of a zeolite crystal. An activatable temperature of the plurality of particles is equal to or lower than 400° C.

The getter material composition according to the twenty-second aspect enables providing a gas adsorbent (60) that is likely to achieve a sufficient adsorption performance in a low-pressure range.

A getter material composition according to a twenty-third aspect contains a getter material and a solvent. The getter material contains a plurality of particles of a zeolite crystal. The plurality of particles includes at least one particle having a particle size equal to or greater than 200 nm.

The getter material composition according to the twenty-third aspect enables providing a gas adsorbent (60) that is likely to achieve a sufficient adsorption performance in a low-pressure range.

A getter material composition according to a twenty-fourth aspect may be implemented in conjunction with the twenty-second or twenty-third aspect. In the getter material composition according to the twenty-fourth aspect, at least one particle accounting for a half or more of a total weight of the plurality of particles has a particle size equal to or greater than 200 nm, and the plurality of particles has a mean particle size equal to or greater than 200 nm.

The getter material composition according to the twenty-fourth aspect enables providing a gas adsorbent (60) that is likely to achieve a sufficient adsorption performance in a low-pressure range.

A getter material composition according to a twenty-fifth aspect may be implemented in conjunction with any one of the twenty-second to twenty-fourth aspects. In the getter material composition according to the twenty-fifth aspect, the solvent includes an organic solvent having a boiling point equal to or lower than 300° C.

The getter material composition according to the twenty-fifth aspect may reduce the energy required to desorb the organic solvent, thus making it easier to provide the gas adsorbent (60).

A getter material composition according to a twenty-sixth aspect may be implemented in conjunction with any one of the twenty-second to twenty-fifth aspects. In the getter material composition according to the twenty-sixth aspect, the solvent includes an organic solvent having a cyclic structure.

The getter material composition according to the twenty-sixth aspect may reduce the energy required to desorb the organic solvent, thus making it easier to provide the gas adsorbent (60).

A getter material composition according to a twenty-seventh aspect may be implemented in conjunction with any one of the twenty-second to twenty-sixth aspects. In the getter material composition according to the twenty-seventh aspect, the solvent includes an organic solvent having a non-aromatic group.

The getter material composition according to the twenty-seventh aspect may reduce the energy required to desorb the organic solvent, thus making it easier to provide the gas adsorbent (60).

A getter material composition according to a twenty-eighth aspect may be implemented in conjunction with any one of the twenty-second to twenty-seventh aspects. The getter material further contains a carbon dioxide adsorbent.

The getter material composition according to the twenty-eighth aspect makes it easier to provide a gas adsorbent (60) with an excellent gas adsorption performance.

A getter material composition according to a twenty-ninth aspect may be implemented in conjunction with any one of the twenty-second to twenty-eighth aspects. The getter material further contains a hydrogenation catalyst.

The getter material composition according to the twenty-ninth aspect makes it easier to provide a gas adsorbent (60) with an excellent gas adsorption performance.

A method for manufacturing a glass panel unit (10) according to a thirtieth aspect includes a working step, an assembling step, a bonding step, and a gas exhausting step. The working step includes preparing the getter material composition according to any one of the twenty-second to twenty-ninth aspects. The assembling step includes preparing an assembly (100) including a first glass pane (20), a second glass pane (30), a peripheral wall (410) having a frame shape, an internal space (500), a gas adsorbent (60) made of the getter material composition described above, and an exhaust port (700). The bonding step includes hermetically bonding the first glass pane (20) and the second glass pane (30) by melting the peripheral wall (410). The gas exhausting step includes exhausting a gas from the internal space (500) through the exhaust port (700) to turn the internal space (500) into an evacuated space (50).

The thirtieth aspect enables providing a glass panel unit (10) that is likely to achieve a sufficient adsorption performance in a low-pressure range.

A glass panel unit (10) according to a thirty-first aspect includes: a first glass pane (20); a second glass pane (30) facing the first glass pane (20); a frame member (40); an evacuated space (50); and a gas adsorbent (60). The frame member (40) hermetically bonds the first glass pane (20) and the second glass pane (30). The evacuated space (50) is surrounded with the first glass pane (20), the second glass pane (30), and the frame member (40). The gas adsorbent (60) is placed in the evacuated space (50). The gas adsorbent (60) contains a getter material. The getter material contains a plurality of particles of a zeolite crystal. At least one particle accounting for a half or more of a total weight of the plurality of particles has a particle size equal to or greater than 200 nm. At least one of a softening point, a melting point, or a bondable temperature of a sealant is equal to or lower than 350° C.

The glass panel unit (10) according to the thirty-first aspect is likely to achieve a sufficient adsorption performance in a low-pressure range.

REFERENCE SIGNS LIST

10 Glass Panel Unit
20 First Glass Pane
30 Second Glass Pane
40 Frame Member
50 Evacuated Space
60 Gas Adsorbent

The invention claimed is:

1. A glass panel unit comprising:
a first glass pane;
a second glass pane facing the first glass pane;
a frame member hermetically bonding the first glass pane and the second glass pane;
an evacuated space surrounded with the first glass pane, the second glass pane, and the frame member; and
a gas adsorbent placed in the evacuated space, wherein:
the gas adsorbent contains a getter material for adsorbing nitrogen and carbon dioxide,
the getter material contains a hydrogenation catalyst and a plurality of particles of a zeolite crystal,
the zeolite crystal is a copper ion-exchanged ZSM-5 type zeolite,
the getter material contains a powder of the hydrogenation catalyst in a weight ratio of 0.0001 to 0.3 part relative to 1 part of the plurality of particles of the zeolite crystal,
at least one particle accounting for a half or more of a total weight of the plurality of particles has a particle size equal to or greater than 200 nm,
an activable temperature of the at least one particle is equal to or lower than 400° C.

2. The glass panel unit of claim 1, wherein
a weight of the rest of the plurality of particles, having a particle size less than 200 nm, accounts for less than a half of the total weight of the plurality of particles.

3. The glass panel unit of claim 1, wherein
the at least one particle accounting for a half or more of the total weight of the plurality of particles has a particle size equal to or greater than 400 nm.

4. The glass panel unit of claim 1, wherein
the at least one particle is a primary particle, and
the particle size is the shortest width of the at least one particle.

5. The glass panel unit of claim 1, wherein the hydrogenation catalyst is ruthenium, rhodium, platinum, palladium, nickel, cobalt, molybdenum, tungsten, iron, copper, titanium, zirconium, aluminum, or oxides thereof.

6. The glass panel unit of claim 1, wherein the copper ion-exchanged ZSM-5 type zeolite has a silica/alumina ratio of greater than 20 and equal to or less than 45.

7. The glass panel unit of claim 6, wherein the copper ion-exchanged ZSM-5 type zeolite has a copper content from 1 wt % to 10 wt %.

* * * * *